United States Patent
Xie et al.

(10) Patent No.: US 10,693,958 B2
(45) Date of Patent: Jun. 23, 2020

(54) SYSTEM AND METHOD FOR ADDING NODE IN BLOCKCHAIN NETWORK

(71) Applicant: ALIBABA GROUP HOLDING LIMITED, Grand Cayman (KY)

(72) Inventors: Guilu Xie, Hangzhou (CN); Ning Xia, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 0 days.

(21) Appl. No.: 16/741,270

(22) Filed: Jan. 13, 2020

(65) Prior Publication Data

US 2020/0153899 A1    May 14, 2020

Related U.S. Application Data

(63) Continuation of application No. 16/715,126, filed on Dec. 16, 2019, which is a continuation of application No. PCT/CN2019/109416, filed on Sep. 30, 2019.

(30) Foreign Application Priority Data

Sep. 5, 2019    (CN) .......................... 2019 1 0838736

(51) Int. Cl.
*G06F 15/16* (2006.01)
*H04L 29/08* (2006.01)
*H04L 9/06* (2006.01)

(52) U.S. Cl.
CPC ........ *H04L 67/1065* (2013.01); *H04L 9/0637* (2013.01); *H04L 9/0643* (2013.01); *H04L 2209/38* (2013.01)

(58) Field of Classification Search
CPC ...... H04W 12/00; H04L 63/00; H04L 9/3239; H04L 67/1065; H04L 9/0637; H04L 9/0643; H04L 2209/38
See application file for complete search history.

(56) References Cited

U.S. PATENT DOCUMENTS

| | | |
|---|---|---|
| 6,594,624 B1 | 7/2003 | Curet |
| 9,372,892 B1 | 6/2016 | Chainani et al. |
| 10,158,527 B2 | 12/2018 | Anderson et al. |
| 10,360,191 B2 | 7/2019 | Christidis et al. |

(Continued)

OTHER PUBLICATIONS

Non-Final Office Action for U.S. Appl. No. 16/715,963 dated Mar. 2, 2020.

(Continued)

*Primary Examiner* — John B Walsh

(57) ABSTRACT

Methods, systems, and apparatus, including computer programs encoded on computer storage media, for adding a node in a blockchain network are provided. One of the methods includes: obtaining, by a current consensus node of the blockchain network, a first transaction comprising a first request for adding the node as a new consensus node of the blockchain network; in response to that consensus verification of the first transaction succeeds, executing the first transaction and numbering the node in a node list based on numbers of a plurality of current consensus nodes of the blockchain network; and performing view change for the node to participate in future consensus verification as the new consensus node of the blockchain network.

20 Claims, 12 Drawing Sheets

(56) References Cited

U.S. PATENT DOCUMENTS

| | | |
|---|---|---|
| 2014/0149715 A1 | 5/2014 | Inman |
| 2017/0300627 A1 | 10/2017 | Giordano et al. |
| 2018/0005186 A1 | 1/2018 | Hunn |
| 2018/0329945 A1 | 11/2018 | Horii et al. |
| 2018/0341930 A1 | 11/2018 | Moir et al. |
| 2019/0026234 A1 | 1/2019 | Harnik et al. |
| 2019/0034465 A1 | 1/2019 | Shimamura |
| 2019/0036887 A1 | 1/2019 | Miller |
| 2019/0058709 A1 | 2/2019 | Kempf et al. |
| 2019/0104196 A1 | 4/2019 | Li et al. |
| 2019/0163887 A1 | 5/2019 | Frederick et al. |
| 2019/0165930 A1 | 5/2019 | Castinado et al. |
| 2019/0166133 A1 | 5/2019 | Frederick et al. |
| 2019/0179939 A1 | 6/2019 | Govindarajan et al. |
| 2019/0188086 A1 | 6/2019 | Maeda et al. |
| 2019/0205873 A1 | 7/2019 | Kamalsky et al. |
| 2019/0207750 A1 | 7/2019 | Harvey |
| 2019/0207751 A1 | 7/2019 | Harvey |
| 2019/0251080 A1 | 8/2019 | Lu et al. |
| 2019/0303927 A1 | 10/2019 | Shao et al. |
| 2019/0327097 A1 | 10/2019 | Tang |
| 2019/0377648 A1 | 12/2019 | Abraham et al. |
| 2019/0379699 A1 | 12/2019 | Katragadda et al. |
| 2019/0386995 A1* | 12/2019 | Chafe ............... G06Q 20/3678 |
| 2020/0004643 A1 | 1/2020 | Yang |
| 2020/0021446 A1 | 1/2020 | Roennow et al. |
| 2020/0059352 A1 | 2/2020 | Walling et al. |

OTHER PUBLICATIONS

Notice of Allowance for U.S. Appl. No. 16/715,126 dated Mar. 5, 2020.

Final Office Action for U.S. Appl. No. 16/715,963 dated Apr. 7, 2020.

* cited by examiner

900

┌─────────────────────────────────────────────────────────┐
│ obtaining, by a current consensus node of a blockchain network, a first │
│ transaction comprising a first request for adding a node as a new consensus │
│ node of the blockchain network │
└─────────────────────────────────────────────────────────┘
                                                        — S901
                            ▼
┌─────────────────────────────────────────────────────────┐
│ in response to that consensus verification of the first transaction succeeds, │
│ executing the first transaction and numbering the node in a node list based │
│ on numbers of a plurality of current consensus nodes of the blockchain │
│ network │
└─────────────────────────────────────────────────────────┘
                                                        — S902
                            ▼
┌─────────────────────────────────────────────────────────┐
│ obtaining from the node a second transaction comprising a second request │
│ for activating the node │
└─────────────────────────────────────────────────────────┘
                                                        — S903
                            ▼
┌─────────────────────────────────────────────────────────┐
│ performing consensus verification of the second transaction │
└─────────────────────────────────────────────────────────┘
                                                        — S904
                            ▼
┌─────────────────────────────────────────────────────────┐
│ in response to that the consensus verification of the second transaction │
│ succeeds, executing the second transaction for activating the node │
└─────────────────────────────────────────────────────────┘
                                                        — S905
                            ▼
┌─────────────────────────────────────────────────────────┐
│ performing view change for the node to participate in future consensus │
│ verification as the new consensus node of the blockchain network │
└─────────────────────────────────────────────────────────┘
                                                        —S906

```
synchronizing, by a node to be added to a blockchain network, with a
blockchain to obtain a first local blockchain copy, wherein the blockchain
network maintains the blockchain and comprises a plurality of current
consensus nodes
```
— S911

```
in response to determining that the first local blockchain copy comprises a
first request to add the node as a new consensus node of the blockchain
network, transmitting to one or more of the plurality of current consensus
nodes a second transaction comprising a second request to activate the node
```
— S912

```
after the second transaction is added to the blockchain, synchronizing the
first local blockchain copy with the blockchain to obtain a second local
blockchain copy
```
— S913

```
after the plurality of current consensus nodes perform a view change with
respect to the blockchain, synchronizing the second local blockchain copy
with the blockchain to obtain a third local blockchain copy
```
— S914

```
participating in consensus verification as the new consensus node of the
blockchain network
```
— S915

FIG. 9B

SYSTEM AND METHOD FOR ADDING NODE IN BLOCKCHAIN NETWORK

CROSS REFERENCE TO RELATED APPLICATION

The present application is a continuation application of the U.S. patent application Ser. No. 16/715,126, filed on Dec. 16, 2019, and entitled "SYSTEM AND METHOD FOR ADDING NODE IN BLOCKCHAIN NETWORK", which is a continuation application of International Patent Application No. PCT/CN2019/109416, filed on Sep. 30, 2019, and entitled "SYSTEM AND METHOD FOR ADDING NODE IN BLOCKCHAIN NETWORK". The PCT application is based on and claims priority to and benefits of Chinese Application No. CN201910838736.9, filed with the China National Intellectual Property Administration (CNIPA) of the People's Republic of China on Sep. 5, 2019. The entire contents of all of the above applications are incorporated herein by reference.

TECHNICAL FIELD

This application generally relates to systems and methods for adding a node in a blockchain network.

BACKGROUND

Blockchain technologies may be built upon transmission networks (e.g., peer-to-peer network). Network nodes in a transmission network may perform data authentication and storage based on a chain-like data structure, and perform data generation and update based on a distributed consensus algorithm. In some cases, such nodes of the blockchain network may need to be added. Accordingly, it is desirable to provide a method for adding a node in a blockchain network.

Existing technologies for adding node often cause disruptions to normal operations of the blockchain. In one example, a current method for adding a node in a blockchain network requires halting the entire blockchain system to perform node addition and requires restarting the system after the addition. As a result, the entire system has to experience down time. In another example, a current method for adding a node in a blockchain network requires deleting an inactivated node and then adding the node back as an activated consensus node. As a result, the deleted and later-added node has to disconnect from the blockchain network before it is added back.

SUMMARY

Various embodiments of the specification include, but are not limited to, systems, methods, and non-transitory computer readable media for adding a node in a blockchain network.

According to some embodiments, a computer-implemented method for adding a node in a blockchain network comprises: obtaining, by a current consensus node of the blockchain network, a first transaction comprising a first request for adding the node as a new consensus node of the blockchain network; in response to that consensus verification of the first transaction succeeds, executing the first transaction and numbering the node in a node list based on numbers of a plurality of current consensus nodes of the blockchain network; and performing view change for the node to participate in future consensus verification as the new consensus node of the blockchain network. In some embodiments, the node to be added may be an inactivated consensus node of the blockchain network prior to the node addition, and by the node addition, the node becomes an activated consensus node of the blockchain network. In some embodiments, node to be added may not be a part of the blockchain network prior to the node addition, and by the node addition, the node joins the blockchain network to become an activated consensus node.

In some embodiments, the first transaction is configured to invoke a blockchain contract deployed in a blockchain that is maintained by the blockchain network.

In some embodiments, the blockchain contract comprises a genesis contract or a system contract.

In some embodiments, the obtaining, by a current consensus node, a first transaction comprises: obtaining the first transaction from a client-side device or a command console of a controller.

In some embodiments, the current consensus node locally maintains the node list, the node list comprising one or more of the following: consensus node identifier, consensus node IP address, and consensus node port number; and the plurality of consensus nodes are numbered sequentially in the node list.

In some embodiments, the node list is in a world state of a blockchain maintained by the blockchain network.

In some embodiments, the numbering the node in a node list based on numbers of a plurality of current consensus nodes of the blockchain network comprises: adding an identifier of the node to an end of the node list and sequentially numbering the node based on the numbers of the plurality of consensus nodes in the node list; or reordering the plurality of consensus nodes and the node in the node list according to a node attribute.

In some embodiments, the performing view change comprises initiating the view change in response to detecting any of the following conditions: a number of consensus nodes in the node list is inconsistent with a number of consensus nodes in a current view; and consensus node identifiers in the node list are inconsistent with consensus node identifiers in the current view.

In some embodiments, the performing view change comprises initiating the view change in response to receiving a message broadcast by the node for initiating view change.

In some embodiments, after the numbering the node in a node list and before the performing view change, method further comprises: obtaining from the node a second transaction comprising a second request for activating the node; performing consensus verification of the second transaction; and in response to that the consensus verification of the second transaction succeeds, executing the second transaction for activating the node.

In some embodiments, the performing view change comprises initiating the view change in response to detecting any of the following conditions: a number of activated consensus nodes in the node list is inconsistent with a number of activated consensus nodes in a current view; and identifiers of activated consensus nodes in the node list are inconsistent with identifiers of the activated consensus nodes in the current view.

In some embodiments, a number of replicas in the view change is a total number of consensus nodes including the node.

According to some embodiments, a system for adding a node in a blockchain network is implemented in a current consensus node of the blockchain network and comprises one or more processors and one or more computer-readable memories coupled to the one or more processors and having instructions stored thereon that are executable by the one or more processors to perform operations comprising: obtaining a first transaction comprising a first request for adding the node as a new consensus node of the blockchain network; in response to that consensus verification of the first transaction succeeds, executing the first transaction and numbering the node in a node list based on numbers of a plurality of current consensus nodes of the blockchain network; and performing view change for the node to participate in future consensus verification as the new consensus node of the blockchain network.

According to other embodiments, a non-transitory computer-readable storage medium is implemented in a current consensus node of a blockchain network and is configured with instructions executable by one or more processors to cause the one or more processors to perform operations comprising: obtaining a first transaction comprising a first request for adding the node as a new consensus node of the blockchain network; in response to that consensus verification of the first transaction succeeds, executing the first transaction and numbering the node in a node list based on numbers of a plurality of current consensus nodes of the blockchain network; and performing view change for the node to participate in future consensus verification as the new consensus node of the blockchain network.

According to yet other embodiments, an apparatus for adding a node in a blockchain network is implemented in a current consensus node of the blockchain network and comprises: an obtaining module for obtaining a first transaction comprising a first request for adding the node as a new consensus node of the blockchain network; an executing module for, in response to that consensus verification of the first transaction succeeds, executing the first transaction and numbering the node in a node list based on numbers of a plurality of current consensus nodes of the blockchain network; and a performing module for performing view change for the node to participate in future consensus verification as the new consensus node of the blockchain network.

According to some embodiments, a computer-implemented method for adding a node in a blockchain network comprises: synchronizing, by the node to be added in the blockchain network, with a blockchain to obtain a first local blockchain copy, wherein the blockchain network maintains the blockchain and comprises a plurality of current consensus nodes; in response to determining that the first local blockchain copy comprises a first request to add the node as a new consensus node of the blockchain network, transmitting to one or more of the plurality of current consensus nodes a second transaction comprising a second request to activate the node; and after the second transaction is added to the blockchain, synchronizing the first local blockchain copy with the blockchain to obtain a second local blockchain copy.

In some embodiments, before the synchronizing with a blockchain, the method further comprises: transmitting a first transaction comprising the first request for adding the node as the new consensus node of the blockchain network to one or more of the plurality of current consensus nodes for the plurality of current consensus nodes to perform consensus verification of the first transaction and to add the first transaction to the blockchain in response to that the consensus verification of the first transaction succeeds.

In some embodiments, before the synchronizing with a blockchain, the method further comprises: transmitting, by one of the plurality of current consensus nodes, a first transaction comprising the first request for adding the node as the new consensus node of the blockchain network to one or more of the plurality of current consensus nodes for the plurality of current consensus nodes to perform consensus verification of the first transaction and to add the first transaction to the blockchain in response to that the consensus verification of the first transaction succeeds.

In some embodiments, the synchronizing with a blockchain comprises: sending one or more synchronization requests respectively to one or more of the plurality of current consensus nodes to obtain data in the blockchain.

In some embodiments, the transmitting to one or more of the plurality of current consensus nodes a second transaction comprising a second request to activate the node comprises: transmitting to one or more of the plurality of current consensus nodes the second transaction comprising the second request to activate the node, for the plurality of current consensus nodes to perform consensus verification of the second transaction and execute the second transaction for activating the node in response to that the consensus verification of the second transaction succeeds.

In some embodiments, the method further comprises: after the plurality of current consensus nodes perform a view change with respect to the blockchain, synchronizing the second local blockchain copy with the blockchain to obtain a third local blockchain copy.

In some embodiments, the method further comprises: participating in consensus verification as the new consensus node of the blockchain network.

In some embodiments, a process of adding the node as the new consensus node of the blockchain network causes no disruption to the blockchain network's operation.

In some embodiments, the method further comprises: determining through checkpoint messages that the synchronization of the first, second, or second local blockchain copy is completed.

In some embodiments, the method further comprises: sending a request for querying a current largest block number to at least some of the plurality of current consensus nodes, and determining that the synchronization of the first, second, or second local blockchain copy is completed through finding a same largest block number returned from the at least some of the plurality of current consensus nodes to be consistent with a largest local block number.

In some embodiments, the first request to add the node as the new consensus node of the blockchain network comprises: a request to change the node from an inactivated consensus node of the blockchain network to an activated consensus node of the blockchain network.

In some embodiments, the first request to add the node as the new consensus node of the blockchain network comprises: a request to include the node in the blockchain network as the new consensus node.

According to other embodiments, a system for adding a node in a blockchain network comprises one or more processors and one or more computer-readable memories coupled to the one or more processors and having instructions stored thereon that are executable by the one or more processors to perform the method of any of the preceding embodiments.

According to yet other embodiments, a non-transitory computer-readable storage medium is configured with instructions executable by one or more processors to cause the one or more processors to perform the method of any of the preceding embodiments.

According to still other embodiments, an apparatus for adding a node in a blockchain network comprises a plurality of modules for performing the method of any of the preceding embodiments.

According to some embodiments, a system for adding a node in a blockchain network is implemented in the node to be added in the blockchain network and comprises one or more processors and one or more computer-readable memories coupled to the one or more processors and having instructions stored thereon that are executable by the one or more processors to perform operations comprising: synchronizing with a blockchain to obtain a first local blockchain copy, wherein the blockchain network maintains the blockchain and comprises a plurality of current consensus nodes; in response to determining that the first local blockchain copy comprises a first request to add the node as a new consensus node of the blockchain network, transmitting to one or more of the plurality of current consensus nodes a second transaction comprising a second request to activate the node; and after the second transaction is added to the blockchain, synchronizing the first local blockchain copy with the blockchain to obtain a second local blockchain copy.

According to other embodiments, a non-transitory computer-readable storage medium is implemented in a node to be added in a blockchain network and is configured with instructions executable by one or more processors to cause the one or more processors to perform operations comprising: synchronizing with a blockchain to obtain a first local blockchain copy, wherein the blockchain network maintains the blockchain and comprises a plurality of current consensus nodes; in response to determining that the first local blockchain copy comprises a first request to add the node as a new consensus node of the blockchain network, transmitting to one or more of the plurality of current consensus nodes a second transaction comprising a second request to activate the node; and after the second transaction is added to the blockchain, synchronizing the first local blockchain copy with the blockchain to obtain a second local blockchain copy.

According to yet other embodiments, an apparatus for adding a node in a blockchain network is implemented in the node to be added in the blockchain network and comprises: a first synchronizing module for synchronizing with a blockchain to obtain a first local blockchain copy, wherein the blockchain network maintains the blockchain and comprises a plurality of current consensus nodes; a transmitting module for, in response to determining that the first local blockchain copy comprises a first request to add the node as a new consensus node of the blockchain network, transmitting to one or more of the plurality of current consensus nodes a second transaction comprising a second request to activate the node; and a second synchronizing module for, after the second transaction is added to the blockchain, synchronizing the first local blockchain copy with the blockchain to obtain a second local blockchain copy.

Embodiments disclosed herein have one or more technical effects. In some embodiments, adding a node in a blockchain network increases the total number of consensus nodes n of the blockchain network (e.g., a Practical Byzantine Fault Tolerance (PBFT) system), which increases the blockchain network's tolerance level for malicious or faulty (e.g., abnormal, offline) nodes, because the maximum number of malicious or faulty nodes f that can be tolerated by a PBFT system equals to $(n-1)/3$, rounded down to the nearest integer. In one embodiment, the faulty status may be caused by, for example, configuration mistake, machine malfunction, network malfunction, software malfunction, etc. Therefore, adding a node in the blockchain network improves the robustness and reliability of the blockchain network. In some embodiments, by dynamically executing a first transaction for adding a node and a second transaction for activating the node, the node can be added as a new consensus node to the pool of existing consensus nodes without having to disrupt the operation of the blockchain network. In one embodiment, system down time is avoided during the node addition process, and the blockchain network sustains its normal operation. In some embodiments, through multiple synchronizations before, between, and after executing the first and second transactions, the newly-added node is able to obtain, within a short time, an identical copy of node list as those kept by existing consensus nodes and synchronize to identical blockchain data. In one embodiment, through view change, all consensus nodes including the added node each obtain the identical copy of node list which comprises numbering of the all consensus nodes. Thus, the added node is able to contribute to consensus verification along with the existing consensus nodes as quickly as possible and avoid wasting computing resources.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as limiting.

BRIEF DESCRIPTION OF THE DRAWINGS

FIGS. 9A and 9B illustrate flowcharts of a method for adding a node in a blockchain network in accordance with various embodiments.

DETAILED DESCRIPTION

Figure 1:
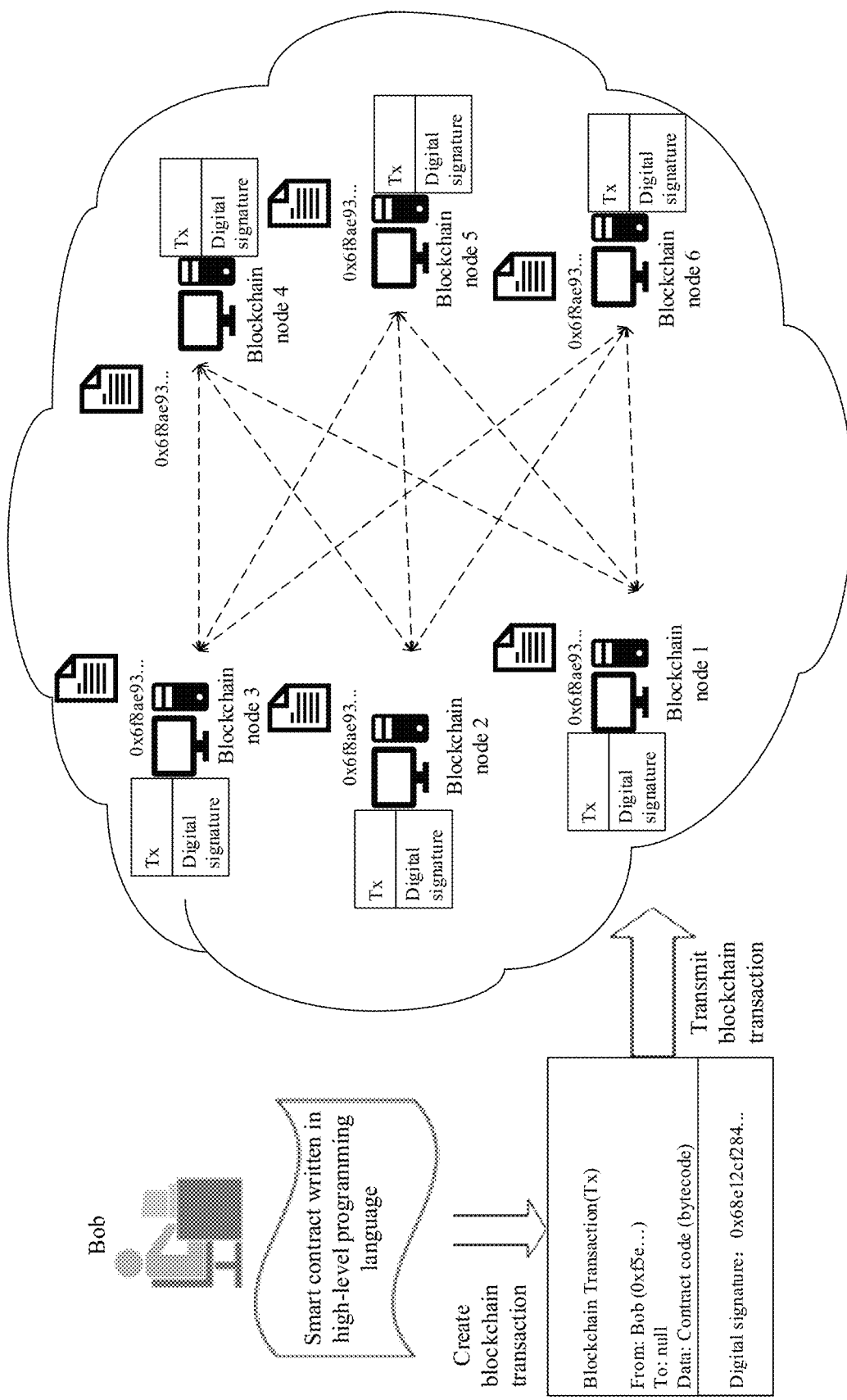
FIG. 1 illustrates a diagram for creating blockchain contract in accordance with various embodiments.

Blockchain may be categorized into three types: Public Blockchain, Private Blockchain, Consortium Blockchain. In addition, there may be various combinations among the three types of blockchain, such as Private Blockchain+ Consortium Blockchain, Consortium Blockchain+Public Blockchain, etc. Among them, Public Blockchain is the most decentralized. For Public Blockchains represented by Bitcoin and Ethereum, participants (blockchain nodes or nodes for short) of the Public Blockchain can read data records from the blockchain, take part in transactions, and compete for bookkeeping rights for new blocks, etc. Also, each participant can freely join and exit the blockchain network and perform related operations. Whereas for Private Blockchain, data-writing rights for the blockchain network may be controlled by a certain entity or organization, and data-reading rights are determined by the entity or organization. Thus, Private Blockchain may be regarded as a weak centralized system, of which participating nodes are restricted and limited in number. Consortium Blockchain lies between Public Blockchain and Private Blockchain and can achieve "partial decentralization." Each node of the Consortium Blockchain may correspond to an entity or organization. Participants may join the Consortium Blockchain network through authorization, forming the consortium with shared interests and collectively maintaining the blockchain network's operation. For any of the various types of blockchain described above, there may be a need for dynamically adding a node in a blockchain network.

In some embodiments, nodes with a certain level of voting power may be referred to as consensus nodes which form a blockchain network and maintain its operation through a consensus protocol. For example, consensus nodes may assume the responsibility of performing consensus verification of blockchain transactions (or transactions for short). By contrast, inactivated nodes (which may or may not be a part of the blockchain network) do not participate in such consensus verification. Through consensus verification, consensus nodes may come to a consensus (agreement) for a newly generated block to add to the blockchain. The newly generated block may comprise one or more transactions that are consensus verified by the consensus nodes. The consensus nodes may also make other consensus decisions for the blockchain, for example, setting service fees for the blockchain.

In some embodiments, consensus nodes may comprise two types: activated and inactivated. Activated consensus nodes may participate in consensus verification and may be stored in a local node list in sequential numbers. Inactivated consensus nodes may not participate in consensus verification, and therefore are not numbered together with the activated consensus nodes in the local node list.

Each of Public Blockchain, Private Blockchain, and Consortium Blockchain may provide smart contract. A smart contract can be deployed in a blockchain through a blockchain transaction and later invoked by another blockchain transactions. For example, Ethereum supports users for creating and invoking complex algorithms. As a programmable blockchain, the core of Ethereum lies with Ethereum virtual machine (EVM). Each Ethereum node may operate an EVM. EVMs are Turing complete, which means that even complex algorithms can be implemented through them. Smart contract deployment and invocation can be executed in the EVMs.

As shown in FIG. 1, Bob may transmit a blockchain transaction comprising smart contract creation to an Ethereum network. Blockchain node 1's EVM may execute the blockchain transaction to generate a corresponding instance of the smart contract. In FIG. 1, "0x6f8ae93 . . . " represents an address of the smart contract. The "data" field of the blockchain transaction may store bytecode. The "to" field of the blockchain transaction may be a null blockchain account. After the blockchain nodes reach consensus through a consensus mechanism, the smart contract is successfully created and deployed in a blockchain that is maintained by the blockchain network, and future users can invoke this deployed smart contract.

After the smart contract is created, a contract account corresponding to the smart contract is created in the blockchain and has a specific address. Contract code and account data will be stored under the contract account. Behaviors of the smart contract are controlled by the contract code, and the contract account stores the status of the smart contract. In other words, smart contract enables creation of virtual accounts comprising contract code and account storage in blockchain.

Figure 2:
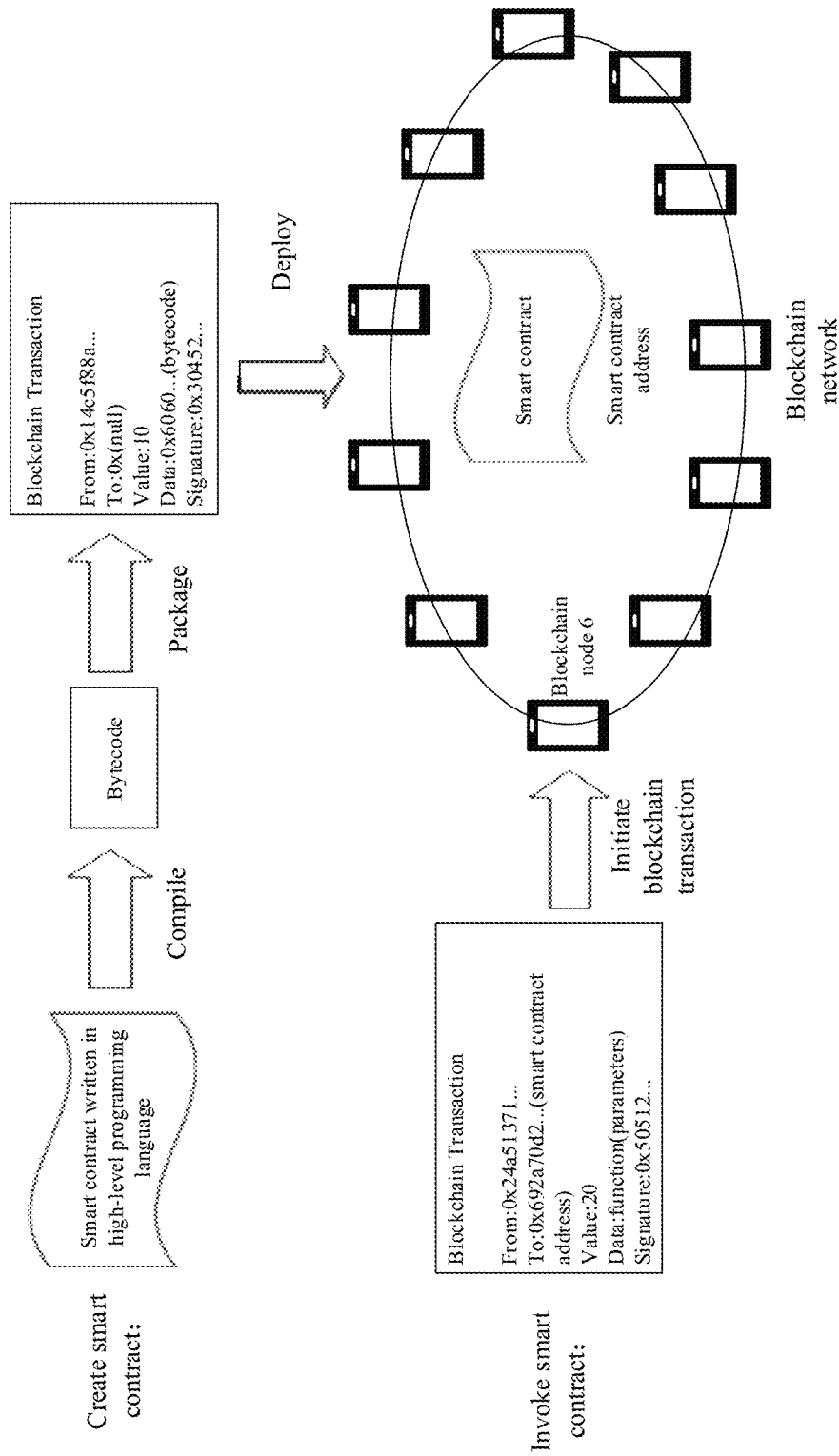
FIG. 2 illustrates a diagram for invoking blockchain contract in accordance with various embodiments.

As shown in FIG. 2, still using Ethereum as an example, Bob transmits a blockchain transaction comprising information for invoking the smart contract to the Ethereum network. Blockchain node 1's EVM may execute the blockchain transaction to generate a corresponding instance of the smart contract. For the blockchain transaction in FIG. 2, the "from" field may comprise an address of a blockchain account invoking the smart contract, "0x6f8ae93 . . . " in the "to" field may represent the address of the smart contract to be invoked, the "value" field may represent an Ether value, the "data" field may store the method and parameters for invoking the smart contract. After invoking the smart contract, the balance of Ethers held by the blockchain account may change. Further, a certain user client may view the balance through a blockchain node (e.g., blockchain node 6 in FIG. 2).

Smart contracts may be independently executed in each blockchain node of the blockchain network according to a prescribed manner. All execution records and data may be stored in the blockchain. Thus, after executing such blockchain transaction, a tamper-resistant and persistent transaction proof is saved to the blockchain.

Figure 3:
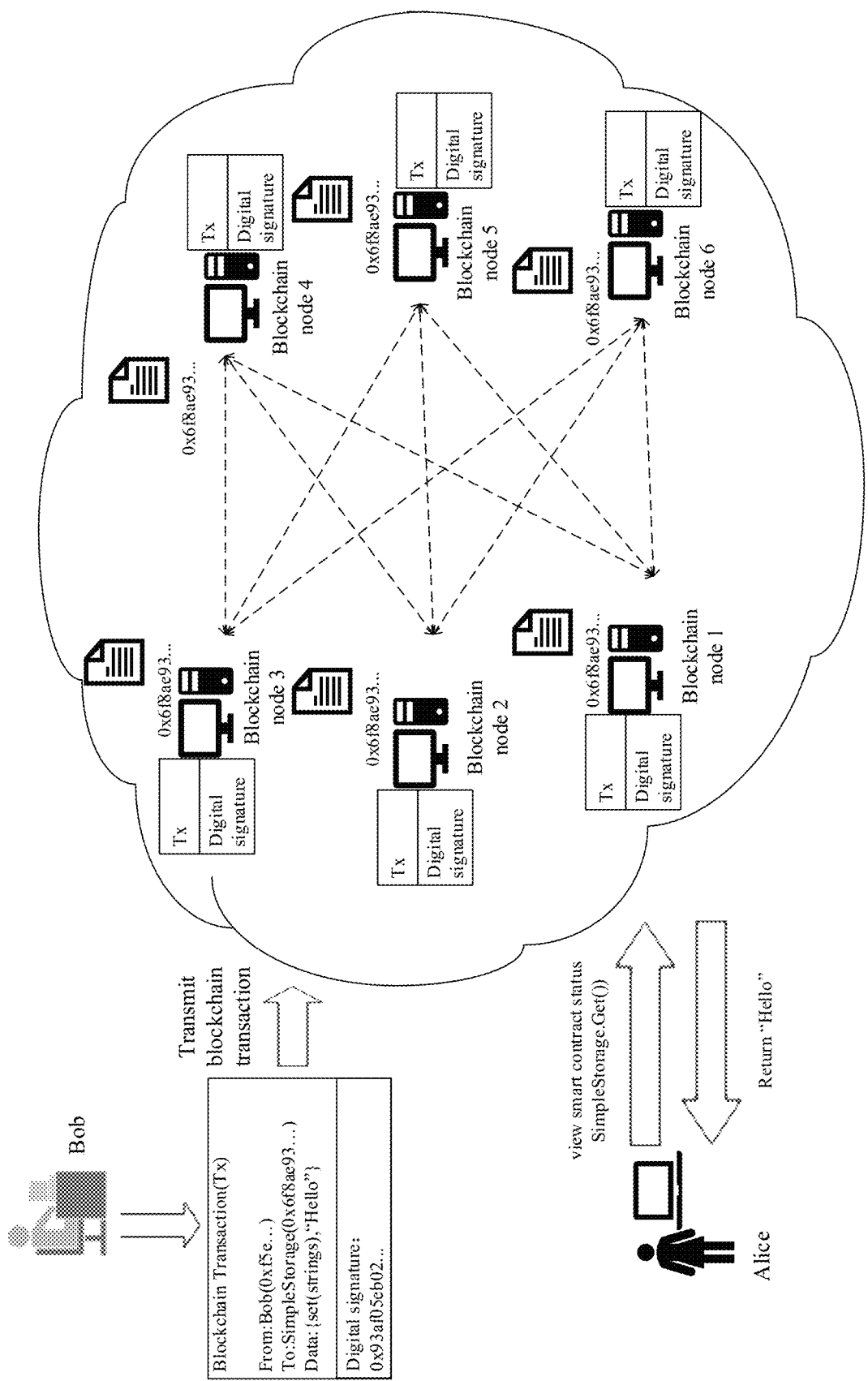
FIG. 3 illustrates a diagram for creating and invoking blockchain contract in accordance with various embodiments.

FIG. 3 shows the creation and invocation of a smart contract. Creating a smart contract in Ethereum involves steps such as writing smart contract, compilation into bytecode, and deployment in blockchain. Invoking a smart contract in Ethereum may refer to initiating a blockchain transaction pointing to an address of the deployed smart contract such that the contract code is executed in an EVM of each node in the Ethereum network.

In addition to having users to create smart contracts, smart contracts can be system-configured in the genesis block of the blockchain. This type of contracts may be referred to as genesis contracts. In genesis contracts, data structure, parameters, properties, and methods of the blockchain network may be configured. Further, accounts with system administrator authorization can create or modify system-level smart contracts ("system contracts" in short). In addition to EVM, different blockchain networks may adopt different virtual machines, which is not limited herein.

One difference between blockchain technologies and traditional decentralization technologies is recordkeeping at each node, or known as distributed recordkeeping, instead of the traditional centralized recordkeeping. In various blockchain networks, consensus algorithm (that is, the aforementioned consensus mechanism) may be implemented to ensure record consistency among the nodes that perform recordkeeping. When a node generates a new block, if the new block is accepted by other nodes, the other nodes will record the same new block. The process for the other nodes to acknowledge the new block is the consensus mechanism. Consensus mechanism is a mechanism in which blockchain nodes reach a network-wide consensus for block information, to ensure that new blocks are correctly added to the blockchain. Currently, mainstream consensus mechanisms include: Proof of Work (POW), Proof of Stake (POS), Delegated Proof of Stake (DPOS), Practical Byzantine Fault Tolerance (PBFT) algorithm, HoneyBadger Byzantine Fault Tolerance algorithm, etc.

In one example of PBFT algorithm, there are some known attempts for dynamically adding node in conjunction with PBFT. For instance, "Dynamic Practical Byzantine Fault Tolerance" (https://ieeexplore.ieee.org/stamp/stamp.jsp?arnumber=8433150) discusses that, to dynamically adding a new node in a blockchain network based on PBFT, a Certificate Authority (CA) node is required as a secure service provider for participating in the addition of the new node, but the CA node does not participate in consensus verification. For another instance, "Solida: A Blockchain Protocol Based on Reconfigurable Byzantine Consensus" (https://eprint.iacr.org/2017/1118.pdf) raises a node addition and deletion algorithm based on Bitcoin POW and PBFT, the algorithm electing the primary node based on POW. However, it is known that POW consumes significant central processing unit (CPU) resources. The following introduces PBFT as an example of the consensus mechanism.

Figure 4:
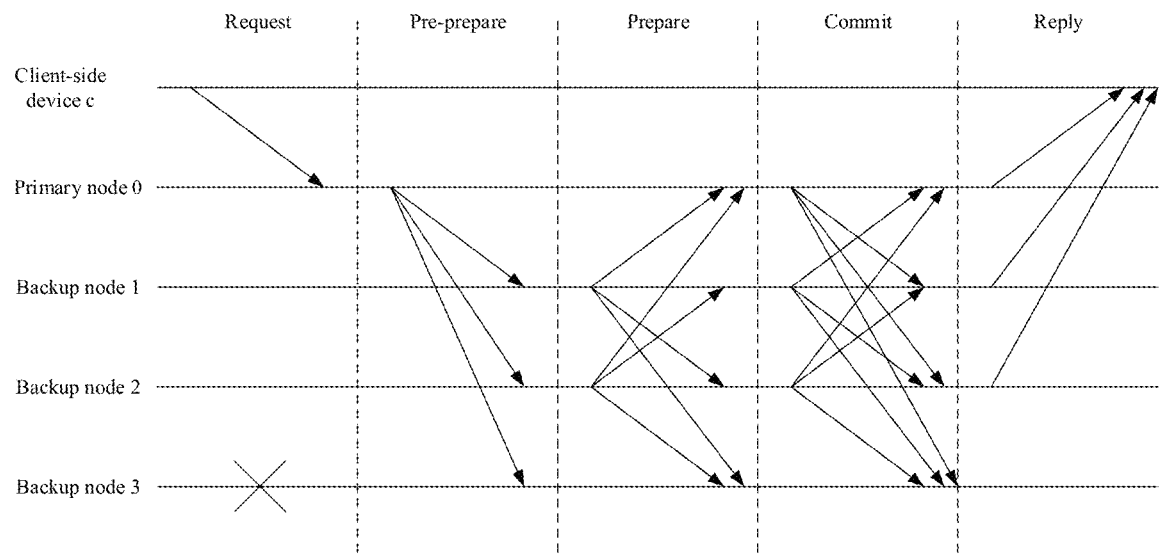
FIG. 4 illustrates a flow diagram for a PBFT algorithm.

FIG. 4 illustrates a flowchart of a traditional PBFT algorithm. The algorithm was proposed by Miguel Castro and Barbara Liskov in 1999, which solves the low efficiency problem for PBFT, lowering the complexity from exponential to polynomial level, which makes applications of PBFT in real-life systems practical. The thesis was published in the Proceedings of the Third Symposium on Operating Systems Design and Implementation (1999). The algorithm assumes that, if up to f backup replicas (i.e., nodes) are malicious or faulty, having a total of 3f+1 or more replicas can guarantee safety and liveness within the asynchronized system. To ensure that all replicas' data are consistent and satisfy the fault-tolerance requirement, a certain number of replicas, such as a set comprising a majority of nodes in a distributed system, are required to form a Quorum. For example, if the total number of replicas n is 3f+1, the Quorum is 2f+1. Thus, for a distributed system comprising four nodes, any three of them may form a Quorum.

Further, all replicas move through a succession of configurations called views. In a view, one replica is the primary node and the others are backup nodes. The primary node of a view is replica p such that p=v mod|R|, where v is the view number, views are numbered consecutively, and R is the number of replicas. When the primary node becomes faulty, a view change protocol needs to be triggered for making adjustment to change the primary node when the system is faulty.

The PBFT algorithm is as follows.

1. Client-side device c sends a request to a primary node 0 (replica 0);

2. The primary node 0 broadcasts the request to each backup node;

3. Each of all the replicas executes the request and sends a corresponding result to the client-side device c;

4. The client-side device c collects identical results respectively from f+1 different replicas as the final result for the operation.

The following discusses an example of PBFT (in conjunction with the famous Byzantine Generals' Problem). Here, it is assumed that n=4 and f=1, that is, there are four nodes in total, of which the number of faulty nodes is one. It is assumed that the node number is respectively 0, 1, 2, and 3, and the faulty node is node 3. The process is as follows.

1. (Request phase) Client-side device c sends the request to the primary node 0;

2. (Pre-prepare phase) Primary node 0 receives the request from client-side device c (or requests from a set of client-side devices), arranges the requests in a sequence (in the case of a set of client-side devices), and packages the request(s) into a message m. Then, the Primary node 0 broadcasts a prep-prepare message to nodes 1, 2, and 3 (i.e., backup nodes 1, 2, and 3, also referred to as replica or node 1, 2, and 3). The pre-prepare message includes the message m.

3. (Prepare phase) After receiving the pre-prepare message, if nodes 1, 2, and 3 successfully validate the message m, each of the nodes 1, 2, and 3 will re-broadcast the message m. For example, node 1 will broadcast a prepare message to nodes 0, 2, and 3; and node 2 will broadcast a prepare message to nodes 0, 1, and 3. Node 3 may experience a downtime and is unable to broadcast. Further, each node receives the prepare messages broadcast by other nodes. Each node may add the prepare message broadcast by itself (the prepare message indicating endorsement by itself) and the received prepare messages (the prepare messages indicating endorsement by other nodes) to a local log. If the node receives Quorum-1 confirmations of the same message (with the pre-prepare message and the Quorum-1 prepare messages, the local log will have a Quorum number of confirmations), the node transitions to the prepare phase.

4. (Commit phase) Each participating consensus node that has entered the prepare phase broadcasts a commit message to other consensus nodes, and adds the commit message broadcast by itself to the local log (the commit message indicating endorsement by itself). Further, the each node receives commit messages broadcast by other nodes. If the node receives Quorum-1 valid commit messages, the node adds the commit messages to the local log (with the commit message broadcast by itself and the Quorum-1 commit messages, the local log will have a Quorum number of commit messages) and transitions to a committed state.

5. (Reply phase) Each of all nodes that participates in consensus verification sequentially executes in its local virtual machine the request or the sequenced requests in the message m of the pre-prepare message, and sends a reply to client-side device c.

If the client-side device c receives f+1 identical reply messages, it indicates that the request put forth by the client-side device c has reached a network-wide consensus. Otherwise, the client-side device c may need to determine whether to re-send the request to the primary node 0.

The process and description above with respect to FIG. 4 is the traditional PBFT algorithm. The process may be initiated by the client-side device, such that one or more transactions in the request message initiated by the client-side device undergo consensus verification, and a result of the consensus verification is returned to the client-side device at the conclusion of the consensus verification.

In the Consortium Blockchain scenario, consensus verification (e.g., the pre-prepare, prepare, and commit process of FIG. 4 above) can be initiated by any node. In the Consortium Blockchain scenario, the client-side device is optional. If excluding the client-side device, the request and reply phases of FIG. 4 become optional, and the primary node may initiate PBFT consensus verification after obtaining a certain number of blockchain transactions. If including the client-side device, the consensus verification may not be initiated by the client-side device, and may rather be initiated by the primary node after the primary node obtains a certain number of blockchain transactions. That is, the pre-prepare phase in FIG. 4 may not be directly triggered by the request phase.

If the primary node acts maliciously or is faulty (e.g., abnormal, offline) and fails to broadcast the request of the client-side device, the client-side device can configure a timeout mechanism. If timeout happens, the client-side device may broadcast the request to all replicas. If a replica detects that the primary node acts maliciously or is faulty (e.g., abnormal, offline), the replica can initiate a view change protocol phase to change the primary node.

In addition, an erroneous proposal put forth by the primary nodes may cause the pre-prepare, prepare, and commit three-phase consensus verification to fail. Alternatively, in the prepare and commit phases, consistent Quorum numbers may not be reached, which also frustrates consensus verification. Under these conditions, view change may also be initiated to change the primary node.

Figure 5:
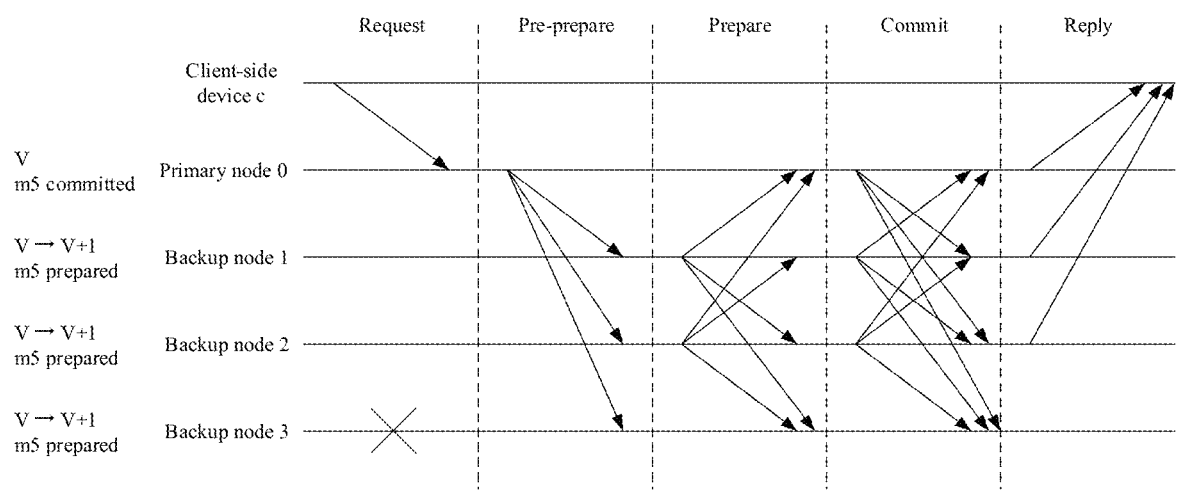
FIG. 5 illustrates a flow diagram for recovering after executing view change of a PBFT algorithm.

In the view change protocol phase, the previous asynchronization between a node and other nodes need to be addressed, to let the node recover after view change (VC). As shown in FIG. 5, for example, at view v before the view change, the primary node replica 0 has committed and executed propose m5 (e.g., message m5) corresponding to <v, n, d>, where v is the view number, n is the total number of nodes, and d is a message digest of the propose m5. However, replica 1 may not have committed propose m5 due to network lagging, and is still in a prepared phase. Replica 2 (and replica 3) may also be in the prepared phase for propose m5. Thereafter, replica 0 experiences downtime. Thus, different nodes are in different states. After changing the primary node, replica 0 may recover through restart. The primary node may have changed to replica 1, and replicas 1-3 need to catch up with replica 0 in the message processing process. Therefore, the new primary node replica 1 needs to re-send propose m5 that is in the prepared state for replicas 1-3 to execute and become synchronized with replica 0's state. Without this, at a new view v+1, replicas 1-3 may complete three-phase consensus verification of a new message m6, but only replica 0 has executed m5, while replicas 1-3 have not executed m5. That is, at the new view v+1, the execution of the new message m6 by replicas 1-3 started from a different state than by replica 0. This may cause inconsistency among virtual machines of different nodes and result in forking. In addition, in the above process, if replica 0 is in prepared state with respect to m5, that is, if replica 0 has not executed m5 on its virtual machine and the other replicas lag behind replica 0 in processing, then replica 0's prepared state can be deleted without affecting the consistency of the overall system.

The view change protocol phase may include a view change protocol process and a new view protocol process. Change of the primary node is completed after the two protocol processes are executed. After the primary node is changed, the view number adds one, changing to v+1. According to p=(v+1)% n, the primary node replica 0 of FIG. 4 is changed to replica 1.

Figure 6:
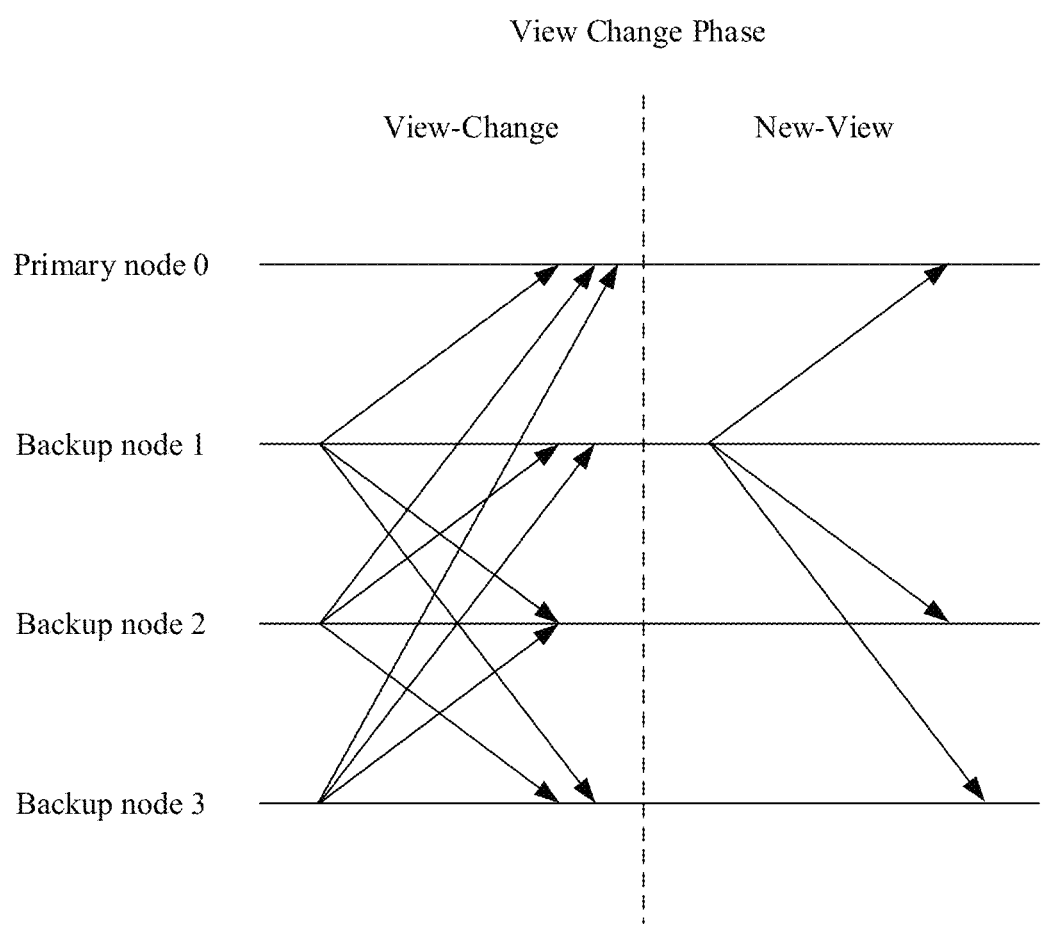
FIG. 6 illustrates a flow diagram for executing view change of a PBFT algorithm.

For example, as shown in FIG. 6, a backup node that detects a malicious or faulty (e.g., abnormal, offline) primary node can broadcast message <view change, v+1, n, C, P, i> to other backup nodes. As shown in FIG. 6, replica 1 detects that the original primary node replica 0 acts maliciously or is faulty (e.g., abnormal, offline), replica 1 sends message <view change, v+1, n, C, P, i> to replica 0, replica 2, and replica 3. Similarly, replica 2 sends message <view change, v+1, n, C, P, i> to replica 0, replica 1, and replica 3, and replica 3 sends message <view change, v+1, n, C, P, i> to replica 0, replica 1, and replica 2.

For the broadcast message, "view change" is a protocol identifier, indicating that the protocol is the view change protocol. The next view number is v+1, and "n" is the number of the latest stable checkpoint, "C" is a set of 2f+1 checkpoint messages that have been verified. "P" is optional, and if present, indicates a set of one or more messages that have reached the prepared state for the backup node that send the view change message (corresponding to each <v, n, d> in the prepared state, including the pre-prepare message and signatures of 2f different nodes).

After the new primary node p=(v+1) mod R such as replica 1 in FIG. 6 receives 2f valid view change messages, the new primary node broadcasts message <new view, v+1, V, O, p> to other nodes. "New view" is a protocol identifier, indicating that the protocol is the new view protocol. The next view number is v+1. "V" includes view change messages along with signatures received by the new primary node from 2f different nodes, as well as the view change message with respect to v+1 sent or to be sent by the new primary node itself. "O" is a set of unexecuted pre-prepare messages re-sent by the primary node, and "p" is the signature of the current node (an existing node of the blockchain network, such as an existing/current consensus node). Selection rules for the set of pre-prepare messages include:

1. Obtain from V the stable checkpoint with the smallest number min-s, obtain from V the prepare message with the largest number max-s.

2. Between min-s and max-s, if message set P exists, then create message <<pre-prepare, v+1, n, d>, m>. Otherwise, create a null pre-prepare message <<pre-prepare, v+1, n, d(null)>, m(null)>, where m(null) is null message, d(null) is a digest of the null message.

When a backup node receives the new view message from the primary node, the backup node validates the signature, the view change message in V, and O. If valid, then the backup node enters the v+1 state, and starts processing the pre-prepare messages in O.

In the example of Consortium Blockchain, in a Consortium Blockchain scenario, a node may correspond to one or more accounts. Similarly, a node may correspond to no account, and merely function as a consensus node. In addition, Consortium Blockchain may comprise genesis contract or a system contract, that may be generated as described above. The genesis contract/system contract may configure a consensus node list (node list or list for short) of the Consortium Blockchain, for example, configure a set of public keys of consensus nodes and arrange the public keys in the set according to a predetermined order. Each consensus node of the Consortium Blockchain may locally store a local node list according the consensus node list in the genesis contract. In the local node list, each consensus node may arrange the consensus nodes according to the corresponding public keys according to the order specified in the generate contract/system contract. Thus, each consensus node's local list includes the same consensus nodes arranged in the same order. Also, in the genesis contract/system contract, method and parameter configurations for consensus nodes may be added. Thus, based on the genesis contract/system contract, each node can accomplish the operation of node addition by changing the nodes in the local node list.

When an account initiates a request to add a consensus node, the request being for example a transaction request, a first current consensus node may receive the request. For example, the request may be a node addition request put forth by a client-side device, thus triggering the process of node addition. Alternatively, the request may be a node addition request received by the first current consensus node from a command console of a controller, thus triggering the process of node addition. The controller may be operated by an administrator controlling the corresponding node, for example, through graphical or coded instructions. For consensus algorithms with primary node such as PBFT, the first current consensus node may be the primary node. The first current consensus node may obtain the transaction request directly from the client-side device or controller, or from other consensus nodes that forwarded the transaction request. For consensus algorithms with no primary node such as HoneyBadger Byzantine Fault Tolerance, there is no primary node, and the first current consensus node is one of a plurality of consensus nodes.

Figure 7:
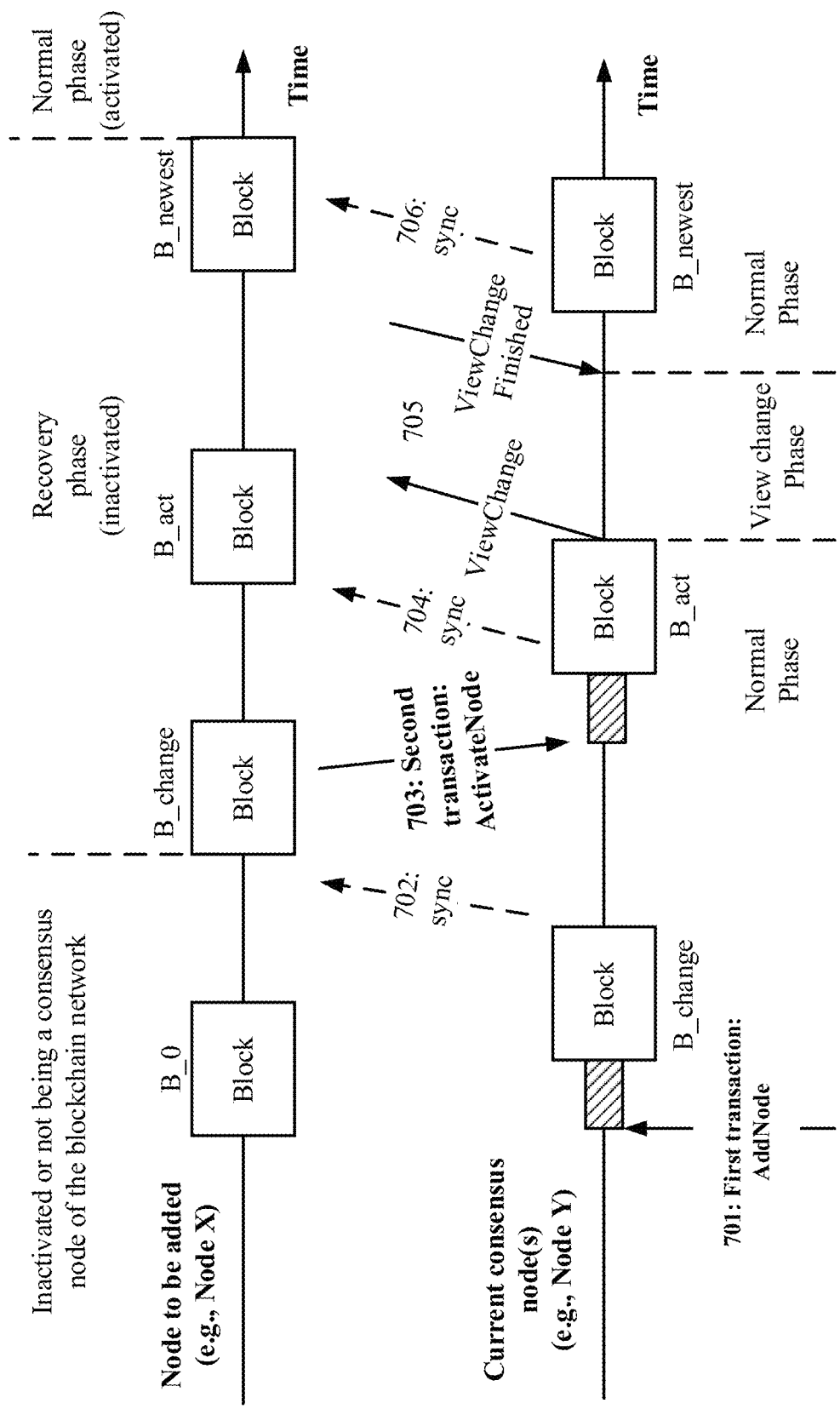
FIG. 7 illustrates a flow diagram for adding a node in a blockchain network in accordance with various embodiments.

FIG. 7 illustrates a flow diagram for adding a node in a blockchain network in accordance with various embodiments. The operations presented below are intended to be illustrative. Depending on the implementation, the exemplary steps may include additional, fewer, or alternative steps performed in various orders or in parallel. FIG. 7 provides an example of adding a node (node X) as a new consensus node of a blockchain network comprising a plurality of current consensus nodes. The blockchain network maintains a blockchain. Node X may be added to become a primary or backup node of a PBFT-based blockchain network.

Adding the node in the blockchain network may include at least the following embodiments. In some embodiments, node X may be an inactivated consensus node of the blockchain network prior to the node addition, and by the node addition, the node X becomes an activated consensus node of the blockchain network. An inactivated consensus node may not participate in consensus verification and therefore may be a non-consensus node. In some embodiments, node X may not be a part of the blockchain network prior to the node addition, and by the node addition, node X joins the blockchain network to become an activated consensus node. An activated consensus node may participate in consensus verification.

FIG. 7 shows two parallel time axes, the top time axis carrying time-dependent statuses of a local blockchain copy of node X and the bottom time axis carrying time-dependent statuses of a local blockchain copy of one of the current consensus nodes (node Y). Each of the current consensus nodes may perform the steps performed by node Y Between the axes, there are various interactions in terms of message communication and data synchronization. In some embodiments, each current consensus node locally maintains a node list, the node list comprising one or more of the following: consensus node identifier, consensus node IP address, and consensus node port number. The plurality of consensus nodes are numbered sequentially in the node list. In one embodiment, the node list is in a world state of a blockchain maintained by the blockchain network.

Along the top axis, node X experiences from being an inactivated consensus node of the blockchain network or not being a consensus node of the blockchain network, through a recovery phase (during which node X is not yet an activated consensus node and cannot perform consensus verification), to reach a normal phase (during which node X is the same as the current consensus node and can perform consensus verification). Along the bottom axis, node Y experiences from a normal phrase (performing consensus verifications as usual), to a View Change phase (synchronizing consensus node states), and back to the normal phase. Also along the top and bottom axes, the blockchain changes its state when one or more new blocks are added, thus the blockchain state is updated from B_0 to B_change, B_act, and B_newest. The "block" box on each axis represents the blockchain as seen or stored by node X or node Y.

In some embodiments, at step 701, an administrative account, external account, or an alternative account may initiate a first transaction "AddNode" to add node X in the blockchain network. The first transaction may be initiated by node X, node Y, or an external device coupled to the blockchain network and broadcast to all of the current consensus nodes. Node Y may obtain the first transaction from a client-side device or a command console of a controller. At this time, node X may keep an original local blockchain copy at B_0 or have no local blockchain copy. Node Y along with other current consensus nodes may perform consensus verification of the first transaction.

In some embodiments, node X may transmit the first transaction comprising a first request for adding node X as the new consensus node of the blockchain network to one or more of the plurality of current consensus nodes for the plurality of current consensus nodes to perform consensus verification of the first transaction and to add the first transaction to the blockchain in response to that the consensus verification of the first transaction succeeds.

In some embodiments, one of the plurality of current consensus nodes may transmit the first transaction comprising the first request for adding node X as the new consensus node of the blockchain network to one or more of the plurality of current consensus nodes for the plurality of current consensus nodes to perform consensus verification of the first transaction and to add the first transaction to the blockchain in response to that the consensus verification of the first transaction succeeds.

In some embodiments, the first request to add node X as the new consensus node of the blockchain network comprises: a request to change node X from an inactivated consensus node of the blockchain network to an activated consensus node of the blockchain network, or a request to include node X in the blockchain network as the new consensus node.

In response to that consensus verification of the first transaction succeeds, node Y may execute the first transaction. Thus, the first transaction is added to the blockchain, and the local blockchain copy of node Y is at B_change. The shaded box attached to the "block" represents a possible time lag before the first transaction is added to the blockchain. In addition, node Y may number node X in a node list based on numbers of a plurality of current consensus nodes of the blockchain network. For example, node Y may add an identifier of node X to an end of the node list of node Y and sequentially numbering node X based on the existing numbers of the plurality of consensus nodes in the node list. For another example, node Y may reorder the plurality of consensus nodes and node X together in the node list according to a node attribute. In one embodiment, before the node addition, the node list indicates that the blockchain network includes node A (number 0), node B (number 1), node C (number 2), and Y (number 3); and after the node addition, the node list indicates that the blockchain network includes node B (number 0), node A (number 1), node C (number 2), node Y (number 3), and X (number 4).

At step 702, node X may synchronize with the blockchain which includes the first blockchain and is at B_change. For example, node X may send one or more synchronization requests respectively to one or more of the plurality of current consensus nodes (e.g., node Y) to obtain data in the blockchain for downloading or updating a local blockchain copy. In one embodiment, node X may send a synchronization request to node Y to obtain all data in the blockchain. In another embodiment, node X may send different synchronization requests to different current consensus nodes for obtaining different data in the blockchain. For example, if a blockchain currently has data stored in 100 blocks, node X may send a synchronization request to node Y for obtaining data in the first 70 blocks and send a different synchronization request to node Z (another current consensus node) for obtaining data in the last 30 blocks, so that collectively node X can obtain data in all of the 100 blocks.

As mentioned, node X may have an original local blockchain copy at B_0 or have no local blockchain copy. In some embodiments, if node X has an original local blockchain copy at B_0, node X may synchronize with the blockchain to update the original local blockchain copy (B_0) to obtain a first local blockchain copy (B_change). In some embodiments, if node X has no local blockchain copy, node X may synchronize with the blockchain to download or otherwise obtain a first local blockchain copy (B_change). Thus, node X obtains a first local blockchain copy of node X at B_change. Node Y may obtain the first transaction comprising the first request for adding node X as a new consensus node of the blockchain network. The first transaction may be configured to invoke a blockchain contract (e.g., genesis contract, system contract) deployed in a blockchain that is maintained by the blockchain network.

Then, according to the first local blockchain copy, node X may determine that the first local blockchain copy comprises the first request to add node X as a new consensus node of the blockchain network, and accordingly initiate a second transaction "ActivateNode." Node X may transmit to one or more of the plurality of current consensus nodes (e.g., Node Y) a second transaction comprising a second request to activate the node. Node Y may obtain from node X the second transaction comprising a second request for activating node X. Node Y along with other current consensus nodes may perform consensus verification of the second transaction.

At step 703, node X may transmit to one or more of the plurality of current consensus nodes the second transaction comprising the second request to activate the node, for the plurality of current consensus nodes to perform consensus verification of the second transaction and execute the second transaction for activating node X in response to that the consensus verification of the second transaction succeeds.

With a successful consensus verification, the second transaction is added to the blockchain, and thus the local blockchain copy of node Y is updated to B_act. The shaded box attached to the "block" represents a possible time lag before the second transaction is added to the blockchain. Node Y may, in response to that the consensus verification of the second transaction succeeds, execute the second transaction for activating the node.

At step 704, after the second transaction is added to the blockchain, the node X may synchronize its first local blockchain copy with the blockchain which includes the seconds blockchain and is at B_act. Thus, the first local blockchain copy of node X is updated to a second local blockchain copy of node X at B_act.

At step 705, a current consensus node (e.g., node Y) may initiate View Change, by which the local blockchain copy of node Y is updated to B_newest. In some embodiments, node Y may initiate the view change in response to detecting any of the following conditions: a number of consensus nodes in the node list is inconsistent with a number of consensus nodes in a current view; and consensus node identifiers in the node list are inconsistent with consensus node identifiers in the current view. In some embodiments, node Y may initiate the view change in response to receiving a message broadcast by node X for initiating view change. Node Y may initiate the view change in response to detecting any of the following conditions: a number of activated consensus nodes in the node list is inconsistent with a number of activated consensus nodes in a current view; and identifiers of activated consensus nodes in the node list are inconsistent with identifiers of the activated consensus nodes in the current view.

Node Y may perform view change for node X to participate in future consensus verification as the new consensus node of the blockchain network. If, instead of immediately entering View Change, a primary node of the current view initiates a next around of consensus verification, the consensus verification may fail temporarily, but eventually all consensus nodes may recover after executing the View Change.

In some embodiments, a number of replicas in the view change is a total number of consensus nodes including node X. That is, n for the view change is one plus the number of current consensus nodes.

At step 706, after the plurality of current consensus nodes perform a view change with respect to the blockchain, node X may synchronize its second local blockchain copy with the blockchain which is at B_newest. Thus, the second local blockchain copy of node X is updated to a third local blockchain copy of node X at B_newest.

Thus, node X determines that itself has been activated as a consensus node and may participate in consensus verifications as the new consensus node of the blockchain network. That is, the consensus nodes including the node X and node Y may perform a next round of consensus verifications.

In some embodiments, node X may (1) determine through checkpoint messages that the synchronization of the first, second, or second local blockchain copy is completed; or (2) send a request for querying a current largest block number (e.g., block height) to at least some of the plurality of current consensus nodes, and determine that the synchronization of the first, second, or second local blockchain copy is completed through finding a same largest block number returned from the at least some of the plurality of current consensus nodes to be consistent with a largest local block number.

As such, the blockchain operation is not disrupted during the node addition. Consensus verification may still be performed during the node addition process. Node addition can be achieved without having to halt the blockchain system, thus eliminating system down time and reducing synchronization time for introducing new nodes.

Figure 8:
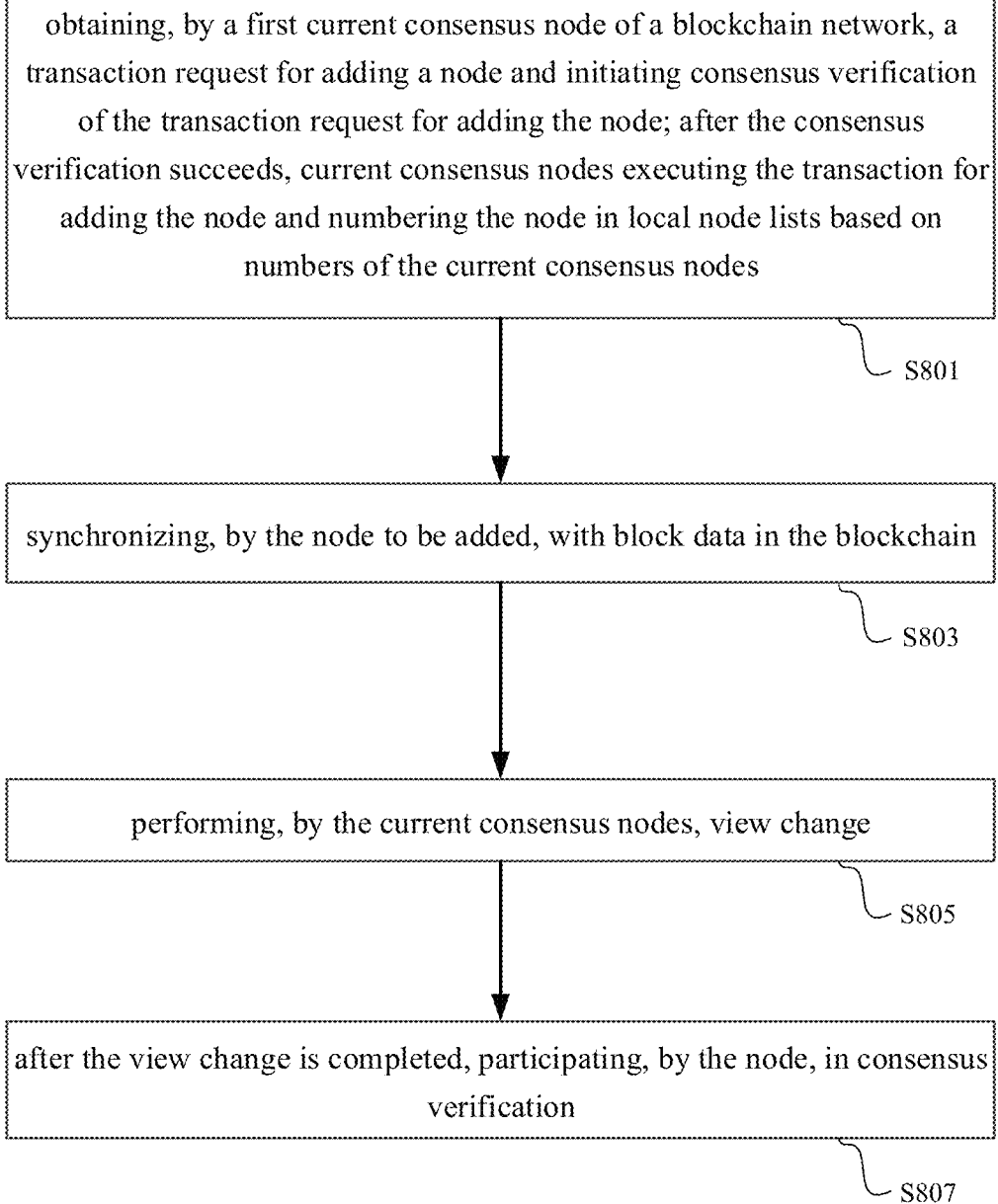
FIG. 8 illustrates a flowchart of a method for adding a node in a blockchain network in accordance with various embodiments.

FIG. 8 illustrates a flowchart of a method 800 for adding a node in a blockchain network in accordance with various embodiments. In some embodiments, the blockchain network may be based on a Consortium Blockchain. In some embodiments, the blockchain network may be based on PBFT.

S801 includes: obtaining, by a first current consensus node of a blockchain network, a transaction request for adding a node and initiating consensus verification of the transaction request for adding the node; after the consensus verification succeeds, current consensus nodes executing the transaction for adding the node and numbering the node in local node lists based on numbers of the current consensus nodes.

In some embodiments, the transaction request may be a transaction request for invoking a contract. In that transaction request, the address of the invoked smart contract, invoking method, and input parameters may be specified. For example, the invoked contract may be the aforementioned genesis contract/system contract, the invoking method may be a method for adding node, and the input parameter may comprise one or more of the following of the node to be added: identifier, IP address, and port number.

In some embodiments, a first current consensus node may trigger the process of node addition through receiving the transaction request for adding the node. For example, as described above, the first current consensus node may trigger the process of node addition through receiving the transaction request for adding the node from a client-side device, or the first current consensus node may trigger the process of node addition through receiving the transaction request for adding the node from a command console of a controller. The controller may be operated by an administrator controlling the corresponding node, for example, through graphical or coded instructions. Alternatively, the first consensus node may receive relevant information of the node to be added from the node to be added for triggering the process of adding the node.

In some embodiments, transaction requests for adding nodes are propagated to the respective consensus nodes in the blockchain network based on the underlying peer-to-peer (P2P) network. After the first current consensus node receives the transaction request for adding the node, the first current consensus node may initiate the consensus verification process as the primary node associated with a consensus algorithm having a primary node or as the consensus node associated with a consensus algorithm having no primary node. Taking consensus algorithms having a primary node such as PBFT as an example, the first current consensus node may be the primary node, and may initiate a consensus verification process for the transaction request for adding the node, that is, mainly including the pre-prepare, prepare, and commit process in FIG. 4 above. Alternatively, the first current consensus node may be a backup node that receives and forwards the transaction request to a primary node for initiating a consensus verification process.

In some embodiments, after the consensus verification is completed, nodes in the blockchain network locally have the message content in the transaction request with respect to the node to be added, and a consensus is reached. Moreover, if the content of the message in the transaction request for adding the node together with other messages form a consensus result, the message content in the transaction request for adding the node has the same message sequence on different nodes, that is, at least a Quorum number of consensus nodes have reached a consensus with respect to the content of and an order associated with the message in the node addition request. The significance of reaching consensus on the content of and the order associated with the message in the node addition request is that if a message contained in a pre-prepare message includes at least two node addition messages, such as adding node m and node n respectively, the content of and the order associated with the messages for consensus verification may be fixed through the primary node. Node m and node n subsequently will have the same sequence number in the local node lists of different consensus nodes. That is, this situation will not appear: in the local node list of a consensus node, node m's number is 4, node n's number is 5; while in the local node list of another consensus node, node n's number is 4, and node m's number is 5.

In some embodiments, after S801, as previously described, at least a Quorum number of consensus nodes have reached consensus with respect to the content of the message in the transaction request including the node addition. Furthermore, the current consensus nodes may execute the corresponding contract locally. For example, the current consensus nodes may invoke the genesis contract/system contract mentioned above, execute the method specified in the invocation of the genesis contract/system contract in a virtual machine such as EVM, and input corresponding parameters. In one example, the input parameters may include, for example, the identifier of the node to be added, the IP address of the node to be added, the port number of the node to be added, and the like. During the execution of the contract, the current consensus nodes may add the identifier of the node to be added to the end of the list and sequentially number it based on the current consensus nodes in the local node list. In this way, at least the consensus node lists maintained by the Quorum number current consensus nodes have the relevant information of the node to be sequentially added in the same manner.

In some embodiments, as mentioned above, the current consensus node can maintain a list of consensus nodes locally, that is, the aforementioned local list of nodes, which records the basic information of all the consensus nodes in the current blockchain network. In one example, the basic information may include, for instance, one or more of: a consensus node identifier, an IP address, a port number, and the like. Among them, the consensus nodes may be sequentially numbered in the local node list. A consensus node may have an identifier (ID), which may be an identifier that uniquely identifies the node, such as a public key, an IP address plus a port number, or the like of the node. The list of consensus nodes, in some blockchain projects, may logically exist in the world state. Take Ethereum, Fabric, and Consortium Blockchain as examples, each node maintains the world state locally, in which the latest states of all the accounts are available. For example, in Ethereum, a node can maintain the latest states of all the accounts based on the contents of the state tree, transaction tree, and receipt tree in the blocks.

In some embodiments, since the consensus nodes have performed several consensuses, theoretically, consistency of the consensus node lists has been maintained among the current consensus nodes. For example, current consensus nodes a, b, c, and d have the local node lists stored in their respective world states, and the current consensus nodes stored in the local node lists of the respective nodes a, b, c, and d are four nodes a, b, c, and d, and are in the order of a-b-c-d. Then, the numbers of a, b, c, and d are 0, 1, 2, and 3, respectively. In this way, for the added node m, each current consensus node performs S801 on the basis of the locally maintained consensus node list, and the nodes in the local node list of the current consensus node include nodes a, b, c, d, and m, a total of five nodes, and the same sequence number (e.g., 4) is configured for the node m.

In some embodiments, during the execution of the contract, in addition to the above-mentioned current consensus nodes adding the identifier of the node to be added to the end of the list and sequentially numbering the node based on the current nodes in the local node list, the current consensus nodes may reorder all consensus nodes including the node to be added by a specified attribute. For example, a current consensus node executes a method in the specified genesis contract/system contract in a virtual machine such as an EVM, the method having defined reordering of all nodes in the local node list according to an attribute. For example, current nodes a, b, c, and d have local node lists stored in their respective world states, and the current consensus nodes stored in the local node lists of the respective nodes a, b, c, and d are a, b, c, d four nodes, and are in the order of a-b-c-d. Then, the numbers of a, b, c, and d are 0, 1, 2, and 3, respectively. In this way, for the added node m, each current consensus node performs S801 on the basis of the locally maintained consensus node list, and the nodes in the local node list of the current consensus node include a, b, c, d, and m, a total of five nodes. For example, the method in the genesis contract/system contract is to reorder all the consensus nodes including the node to be added according to the specified attribute public key, that is, the public key is sorted as a string. With a comparison from the highest bit and continuing to the lowest bit, for example, the result after reordering is a-b-m-c-d. Thus, the numbers of a, b, m, c, and d are 0, 1, 2, 3, and 4, respectively. It can be seen that the number of the newly added node m is 2, and the numbers of the current nodes c and d have changed respectively from 2 to 3 and from 3 to 4.

S803 includes synchronizing, by the node to be added, with block data in the blockchain.

In some embodiments, as such, the node to be added joins the blockchain network and becomes one of the nodes. If the node to be added joins the blockchain network and becomes a consensus node, that is, subsequently participates in the consensus verification process, the node to be added may need to obtain all the block data of the blockchain and a list including all the consensus nodes in the blockchain network. When the node to be added obtains all the block data of the blockchain, each transaction can be executed in the local state machine in the sequence from the genesis block to the latest block, thereby updating the local world state. Since the transactions from the genesis block to the latest blockchain executed by the node to be added are the same as those by the other consensus nodes from the genesis block to the latest block, the world state of the node to be added can keep consistent with the world states of the other consensus nodes. In this way, after the node to be added subsequently becomes the consensus node, the node to be added can be at the same initial state as the other current nodes to perform subsequent transactions, and keep its world state consistent with that of the other current nodes.

In some embodiments, in order to obtain all the block data of the blockchain, the node to be added may broadcast a synchronization request to some or all of the current nodes to obtain the blocks from the current nodes. In one embodiment, the node to be added may send a synchronization request to a current node, so as to obtain all block data from the current node.

In some embodiments, in addition, to achieve high efficiency, similar to the P2P propagation principle, the node to be added may broadcast a synchronization request for acquiring different blocks to different current nodes, and the sum of the synchronization requests is to acquire all the blocks. For example, there are a total of ten blocks from 0 to 9, and the node to be added may request to obtain the blocks 0-3 from the current node 1, request to obtain the blocks 4-6 from the current node 2, and request to obtain blocks 7-10 from the current node 3. In this way, after the node to be added acquires the different blocks from the different current nodes, all the blocks can be formed.

In some embodiments, all blocks generally include every block from the genesis block to the newly generated block. The node to be added can use a checkpoint message to determine whether the synchronization of the block is completed.

In some embodiments, in the foregoing PBFT three-phase process, each replica records in a message log of the replica's local memory, when the replica sends out a message or receives messages sent by other nodes (including pre-prepare, prepare, commit messages). As PBFT progresses, the log takes up a lot of memory. Thus, in order to save memory space, garbage collection needs to be performed, that is, clearing the log when the replica completes execution of the propose. One way is that every time a replica executes a propose, the replica broadcasts to other nodes to reach a network-wide consensus on whether the log can be cleared. Each replica also broadcasts to other replicas after receiving the broadcast. If confirmations are received for a Quorum number of different nodes, these nodes delete message records corresponding to the propose in the local logs. Another way is that if a replica executes K proposes and broadcasts to other nodes to reach a network-wide consensus on whether the log can be cleared. Each replica also broadcasts to other replicas after receiving the broadcast. If confirmations are received for a Quorum number of different nodes, these nodes delete message records corresponding to the K proposes in the local logs. The above deleted log message is a checkpoint message in the format <CHECKPOINT, n, d, i>. Where n is the smallest sequence number that the current node expects to keep, d is the message digest that is expected to be preserved, and i is the replica number from which the checkpoint message is issued. Both the checkpoint message issued by replica and the checkpoint message received are logged to the message log. If replica i receives the Quorum-1 valid checkpoint messages from different nodes and with the checkpoint message sent by itself, the checkpoint messages for <n, d> in the log reach the Quorum number, then all messages before n are cleared (including pre-prepare, prepare, commit messages, and can also include checkpoint messages).

In some embodiments, whether the node to be added mentioned above has completed synchronization of the block data can be determined by using the checkpoint message. In one example, the node to be added can receive Quorum-1 valid checkpoint messages sent by different nodes, of which the n is consistent with the largest n of the node to be added synchronized with the blockchain data, it can be determined that the synchronization with the block data is completed.

In some embodiments, in addition, the checkpoint message can also directly indicate the current latest block number. The node to be added may receive Quorum-1 valid checkpoint messages sent by different nodes, in which the specified current latest block number is consistent with the largest block number in the blocks to which the node to be added has synchronized, it can be determined that synchronization of all blocks has been completed.

In some embodiments, the node to be added may alternatively send a request for querying the current largest block number to other nodes, and determine that synchronization to the block data is completed through finding the same largest block number fed back from most nodes consistent with the largest local block number.

In some embodiments, S801 and S803 are not strictly sequential and can be executed asynchronously or in parallel.

S805 includes performing, by the current consensus nodes, view change.

In S801, after the current consensus nodes execute the transaction for adding the node, the current consensus nodes may update the local node lists. In the current view, the original nodes participating in consensus verification and their order have not changed. In this way, after the current consensus nodes perform the transaction of adding the node, they may detect that the number of consensus nodes in the local consensus node list is inconsistent with the number of consensus nodes in the current view, or detect that the consensus node identifiers in the local consensus node list are inconsistent with the consensus node identifiers in the current view. Thus, the current consensus node may initiate view change.

In some embodiments, after the node to be added has synchronized with the blockchain data of the blockchain, the node may broadcast a message for initiating view change to the blockchain network, indicating that the node to be added has completed synchronization, has the ability to join the blockchain network and serve as a consensus node, and requests to initiate view change. Thus, the current consensus nodes may initiate the view change process after receiving the message.

In some embodiments, the R in the view change process (that is, the number of replicas in the view change process) is the total number of consensus nodes including the node to be added, that is, the number of nodes in the local node list including the node to be added.

In some embodiments, similar to the foregoing, a current consensus node may broadcast messages <view change, v+1, n, C, P, i> to other replica nodes, where n is the number of the latest stable checkpoint, C is the set of 2f+1 verified checkpoint messages, and P is the set of pre-prepare and prepare messages for which the current replica node has not completed processing.

In some embodiments, assuming that the current nodes include nodes 0, 1, 2, and 3, and the node to be added is node 4. Node 0 is, for example, a primary node in the PBFT, and nodes 1, 2, and 3 are, for example, backup nodes in the PBFT. The number of the new primary node can be calculated by p=(v) mod|R|. For example, if p=1, then the new primary node is node b. Here, R is the number of nodes in the local node list including the node to be added. For example, there are a total of four current consensus nodes numbered 0, 1, 2, and 3 respectively. Each current consensus node records the numbers of the four nodes 0, 1, 2, and 3 in the local node list. In this case, R is equal to four. In an example with the execution of S801 to S805, each current consensus node may sequentially number the node to be added based on the numbers of the nodes already in the local node list, that is, the node to be added may be sequentially numbered as 4. In this case, R becomes five. The view number in the process of view change increases, that is, from v to v+1 as described above.

In some embodiments, when the genesis contract/system contract is invoked in S801, the invoked method is a method of adding a node. After the consensus verification is completed, the current consensus nodes execute the transaction for adding the node, and number the node to be added based on the numbers of the consensus nodes already in the local node list. The added node can be initialized to a default inactivated state (e.g., being inactive) in the local node list. Further, the node to be added may attempt to activate itself by initiating a transaction request, and the current consensus nodes may also change the newly added node from the inactivated state to the activated state by executing the corresponding transaction after reaching consensus.

In this way, between S803 and S805, the method further includes that: after the node to be added synchronizes with the block data in the blockchain, the node to be added sends a transaction request for node activation to the blockchain network, and the current consensus nodes execute the transaction request for node activation after performing consensus verification.

In some embodiments, after the node to be added completes the synchronization of all the block data, the transaction request for node activation can be sent to the blockchain network. In one example, the node to be added may send a transaction request for node activation to the blockchain network through the account of itself. Similar to the aforementioned transaction request for node addition, the transaction request for node activation may also be a transaction invoking a contract. Correspondingly, the method for node activation may already exist in the genesis contract/system contract. The transaction request for node activation may indicate a method in the called genesis contract/system contract, and may include parameters such as node identifier, node IP address, node port number, and the like.

In some embodiments, similarly, the transaction request for node activation may be propagated to each consensus node in the blockchain network based on the underlying peer-to-peer (P2P) network. A current consensus node may initiate a consensus verification of the transaction request for node activation. Taking consensus algorithms with primary node such as PBFT as an example, the first current consensus node may be the primary node, and may initiate a consensus verification process for a transaction request including the transaction request for node activation, that is, mainly including the pre-prepare, prepare, and commit process in FIG. 4 above.

In some embodiments, after the consensus verification is completed, at least a Quorum number of consensus nodes in the blockchain network locally has the message content in the transaction request for node addition, and a consensus is reached. Furthermore, the current consensus nodes can invoke the corresponding contract locally to execute. For example, a current consensus node may invoke the genesis contract/system contract mentioned above, execute the method specified in the invoked genesis contract/system contract in a virtual machine such as EVM, and input corresponding parameters. In one example, the input parameters include the aforementioned node identifier, node IP address, node port number, and the like. During the execution of the contract, the current consensus node configures in the local node list the status of the node in the inactivated state to activated. In addition, the current consensus node detects that the number of activated consensus nodes in the local consensus node list is inconsistent with the number of activated consensus nodes in the current view, or detects that the identifiers of the activated consensus nodes in the local consensus node list are inconsistent with identifiers of the activated consensus nodes in the current view. Thus, the current consensus node may initiate view change.

In some embodiments, the transaction request for node activation will form a new block after passing the consensus verification (the block may also include transactions other than the transaction for node activation). The newly generated block exists on at least a Quorum number of current consensus nodes after the consensus verification, and does not exist in the newly activated node (i.e., the just added node). This is because the node that was just activated did not participate in the consensus verification before its activation. Thus, the node to be added may continue to send a synchronization request to some or all of the current nodes after S801, thereby acquiring the block from the current nodes. In this way, the node to be added can acquire the block containing the transaction request for node activation.

S807 includes after the view change is completed, participating, by the node, in consensus verification.

In some embodiments, after the view change is completed, each of the consensus nodes including the node to be added locally has the same node number list and has the same block data, so that the node to be added can participate in consensus verifications, that is, perform consensus verification with the current consensus nodes. In this way, the process of node addition is completed.

The method 800 may be further decoupled into a method 900 performed by a current consensus node of a blockchain network maintaining a blockchain (FIG. 9A) and a method 910 performed by a node to be added in the blockchain network (FIG. 9B).

FIGS. 9A and 9B illustrate flowcharts of a method for adding a node in a blockchain network in accordance with various embodiments. FIG. 9A illustrates steps performed by a current consensus node of a blockchain network maintaining a blockchain, and the steps may be referred to as method 900. FIG. 9B illustrates steps performed by a node to be added in the blockchain network, and the steps may be referred to as method 910.

Adding the node in the blockchain network may include at least the following embodiments. In some embodiments, the node to be added may be an inactivated consensus node of the blockchain network prior to the node addition, and by the node addition, the inactivated consensus node becomes an activated consensus node of the blockchain network (that is, a new consensus node of the blockchain network). An inactivated consensus node may not participate in consensus verification and therefore may be a non-consensus node. In some embodiments, the node to be added may not be a part of the blockchain network prior to the node addition, and by the node addition, the node joins the blockchain network to become an activated consensus node. An activated consensus node may participate in consensus verification.

Figure 10:
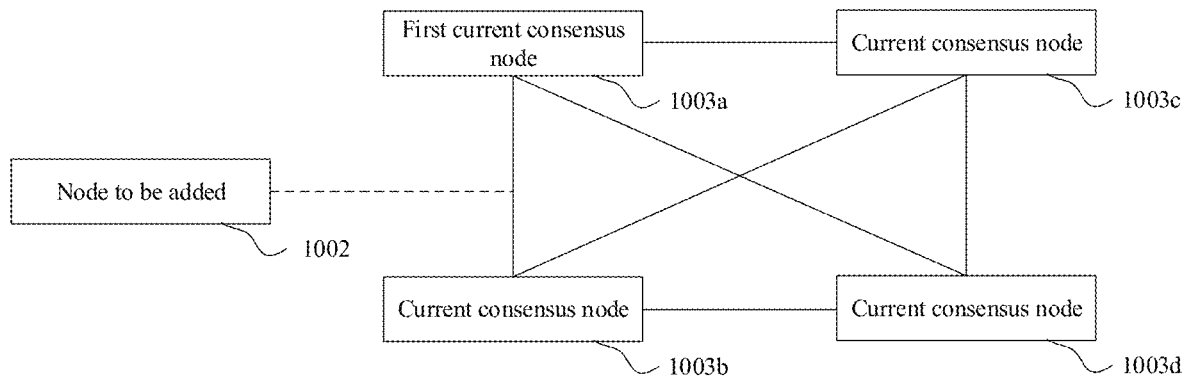
FIG. 10 illustrates a block diagram for implementing a blockchain network in accordance with various embodiments.

Referring to FIG. 9A, the method 900 may be performed by a device, apparatus, or system for adding a node in a blockchain network, such as a current consensus node of the blockchain network (e.g., the blockchain node of FIGS. 1-3, the current consensus node of FIG. 7 or FIG. 10). The current consensus node may be an existing consensus node prior to the node addition. The current consensus node may be a primary or backup node of a PBFT-based blockchain network. The current consensus node may be implemented by a system or device (e.g., computer, server) comprising various hardware machine and/or software. For example, the system or device may comprise one or more processors and one or more non-transitory computer-readable storage media (e.g., one or more memories) coupled to the one or more processors and configured with instructions executable by the one or more processors to cause the system or device (e.g., the processor) to perform the method 900.

The operations of method 900 presented below are intended to be illustrative. Depending on the implementation, the method 900 may include additional, fewer, or alternative steps performed in various orders or in parallel. One or more steps below such as blocks S903-S905 may be optional. Further details of the method 900 can be referred to FIG. 1 to FIG. 8 and FIG. 10 and related descriptions. The steps for adding a node in a blockchain network described with reference to FIG. 1 to FIG. 8 and FIG. 10 are included in the method 900.

Block S901 includes: obtaining, by a current consensus node of a blockchain network, a first transaction comprising a first request for adding a node as a new consensus node of the blockchain network. In some embodiments, the first transaction is configured to invoke a blockchain contract deployed in a blockchain that is maintained by the blockchain network. In some embodiments, the blockchain contract comprises a genesis contract or a system contract.

In some embodiments, the obtaining, by a current consensus node, a first transaction comprises: obtaining the first transaction from a client-side device or a command console of a controller.

Block S902 includes: in response to that consensus verification of the first transaction succeeds, executing the first transaction and numbering the node in a node list based on numbers of a plurality of current consensus nodes of the blockchain network. In some embodiments, the current consensus node locally maintains the node list, the node list comprising one or more of the following: consensus node identifier, consensus node IP address, and consensus node port number; and the plurality of consensus nodes are numbered sequentially in the node list. In some embodiments, the node list is in a world state of a blockchain maintained by the blockchain network.

In some embodiments, the numbering the node in a node list based on numbers of a plurality of current consensus nodes of the blockchain network comprises: adding an identifier of the node to an end of the node list and sequentially numbering the node based on the numbers of the plurality of consensus nodes in the node list; or reordering the plurality of consensus nodes and the node in the node list according to a node attribute.

Block S903 includes: obtaining from the node a second transaction comprising a second request for activating the node.

Block S904 includes: performing consensus verification of the second transaction.

Block S905 includes: in response to that the consensus verification of the second transaction succeeds, executing the second transaction for activating the node.

Block S906 includes: performing view change for the node to participate in future consensus verification as the new consensus node of the blockchain network. In some embodiments, a number of replicas in the view change is a total number of consensus nodes including the node.

In some embodiments, the performing view change comprises initiating the view change in response to detecting any of the following conditions: a number of consensus nodes in the node list is inconsistent with a number of consensus nodes in a current view; and consensus node identifiers in the node list are inconsistent with consensus node identifiers in the current view.

In some embodiments, the performing view change comprises initiating the view change in response to receiving a message broadcast by the node for initiating view change.

In some embodiments, the performing view change comprises initiating the view change in response to detecting any of the following conditions: a number of activated consensus nodes in the node list is inconsistent with a number of activated consensus nodes in a current view; and identifiers of activated consensus nodes in the node list are inconsistent with identifiers of the activated consensus nodes in the current view.

Referring to FIG. 9B, the method 910 may be performed by a device, apparatus, or system for adding a node in a blockchain network, such as a node to be added in the blockchain network (e.g., the node to be added of FIG. 7 or FIG. 10). The node may be added to become a primary or backup node of a PBFT-based blockchain network.

The node to be added may be implemented by a system or device (e.g., computer, server) comprising various hardware machine and/or software. For example, the system or device may comprise one or more processors and one or more non-transitory computer-readable storage media (e.g., one or more memories) coupled to the one or more processors and configured with instructions executable by the one or more processors to cause the system or device (e.g., the processor) to perform the method 910.

The operations of method 910 presented below are intended to be illustrative. Depending on the implementation, the method 910 may include additional, fewer, or alternative steps performed in various orders or in parallel. One or more steps below such as blocks S914-S915 may be optional. Further details of the method 910 can be referred to FIG. 1 to FIG. 8 and FIG. 10 and related descriptions. The steps for adding a node in a blockchain network described with reference to FIG. 1 to FIG. 8 and FIG. 10 are included in the method 910.

Block S911 includes: synchronizing, by the node to be added in the blockchain network, with a blockchain to obtain a first local blockchain copy, wherein the blockchain network maintains the blockchain and comprises a plurality of current consensus nodes. In some embodiments, the synchronizing with a blockchain comprises: sending one or more synchronization requests respectively to one or more of the plurality of current consensus nodes to obtain data in the blockchain.

In some embodiments, before the synchronizing with a blockchain, the method further comprises: transmitting a first transaction comprising the first request for adding the node as the new consensus node of the blockchain network to one or more of the plurality of current consensus nodes for the plurality of current consensus nodes to perform consensus verification of the first transaction and to add the first transaction to the blockchain in response to that the consensus verification of the first transaction succeeds.

In some embodiments, before the synchronizing with a blockchain, the method further comprises: transmitting, by one of the plurality of current consensus nodes, a first transaction comprising the first request for adding the node as the new consensus node of the blockchain network to one or more of the plurality of current consensus nodes for the plurality of current consensus nodes to perform consensus verification of the first transaction and to add the first transaction to the blockchain in response to that the consensus verification of the first transaction succeeds.

Block S912 includes: in response to determining that the first local blockchain copy comprises a first request to add the node as a new consensus node of the blockchain network, transmitting to one or more of the plurality of current consensus nodes a second transaction comprising a second request to activate the node. In some embodiments, the transmitting to one or more of the plurality of current consensus nodes a second transaction comprising a second request to activate the node comprises: transmitting to one or more of the plurality of current consensus nodes the second transaction comprising the second request to activate the node, for the plurality of current consensus nodes to perform consensus verification of the second transaction and execute the second transaction for activating the node in response to that the consensus verification of the second transaction succeeds.

In some embodiments, the first request to add the node as the new consensus node of the blockchain network comprises: a request to change the node from an inactivated consensus node of the blockchain network to an activated consensus node of the blockchain network.

In some embodiments, the first request to add the node as the new consensus node of the blockchain network comprises: a request to include the node in the blockchain network as the new consensus node.

Block S913 includes: after the second transaction is added to the blockchain, synchronizing the first local blockchain copy with the blockchain to obtain a second local blockchain copy.

Block S914 includes: after the plurality of current consensus nodes perform a view change with respect to the blockchain, synchronizing the second local blockchain copy with the blockchain to obtain a third local blockchain copy.

Block S915 includes: participating in consensus verification as the new consensus node of the blockchain network. In some embodiments, a process of adding the node as the new consensus node of the blockchain network causes no disruption to the blockchain network's operation.

In some embodiments, the method further comprises: determining through checkpoint messages that the synchronization of the first, second, or second local blockchain copy is completed.

In some embodiments, the method further comprises: sending a request for querying a current largest block number to at least some of the plurality of current consensus nodes, and determining that the synchronization of the first, second, or second local blockchain copy is completed through finding a same largest block number returned from the at least some of the plurality of current consensus nodes to be consistent with a largest local block number.

FIG. 10 illustrates a block diagram for implementing a blockchain network in accordance with various embodiments. As shown, before the node addition, the blockchain network may comprise a plurality of current consensus nodes 1003 (e.g., 1003a, 1003b, 1003c, 1003d), and a node to be added 1002 is to be added in the blockchain network. Any of the current consensus nodes may be a first current consensus node for receiving a first transaction. Here, node 1003a is designated as the first current consensus node. After the node addition is completed, the blockchain network may comprise the nodes 1002, 1003a, 1003b, 1003c, and 1003d all as consensus nodes. In some embodiments, the blockchain network may be based on PBFT, and at each view, one of its nodes may be a primary nodes, with the remaining nodes being backup nodes.

In some embodiments, a blockchain system includes node to be added 1002 and the plurality of current consensus nodes 1003. A first current consensus node 1003a is configured for obtaining a transaction request for adding a node 1002 and initiating consensus verification of the transaction request for adding the node 1002 in the blockchain network. After the consensus verification succeeds, each of the current consensus nodes 1003 is configured for executing the transaction for adding the node 1002 and numbering the node 1002 in local node list based on numbers of the current consensus nodes. The node to be added 1002 is configured for synchronizing with block data in the blockchain. The current consensus nodes 1003 are configured for performing view change. The node 1002 is configured for, after the view change is completed, participating in consensus verification with respect to the blockchain.

In some embodiments, the transaction request for adding the node comprises a transaction request for invoking a contract. In some embodiments, the invoked contract comprises a genesis contract or a system contract. In some embodiments, the obtaining, by a first current consensus node 1003*a*, a transaction request for adding a node comprises: obtaining, by the first current consensus node 1003*a*, the transaction request for adding the node from a client-side device; or obtaining, by the first current consensus node 1003*a*, the transaction request for adding the node from a command console of a controller.

In some embodiments, each of the current consensus nodes 1003 is configured for locally maintaining a node list, the node list comprising one or more of the following: consensus node identifier, consensus node IP address, and consensus node port number, wherein consensus nodes are numbered sequentially in the node list. In one embodiment, the node list locally maintained by the consensus node is in a world state.

In some embodiments, to execute the transaction for adding the node and numbering the node in local node lists based on numbers of the current consensus nodes, each of the current consensus nodes 1003 is configured for executing the transaction for adding the node, and adding an identifier of the node to be added to an end of the lists and sequentially numbering the node to be added based on the current consensus nodes in the local node lists; or configured for executing the transaction for adding the node, and reordering all consensus nodes including the node to be added in the local node lists according to a specified attribute.

In some embodiments, to synchronize with block data in the blockchain, the node to be added 1002 is configured for sending a synchronization request to a current node to obtain all block data from the current node; or configured for sending synchronization requests for obtaining different blocks to different current nodes.

In some embodiments, the node to be added 1002 is configured for determining that the synchronization with the block data is completed through checkpoint messages; or configured for sending a request for querying a current largest block number to other nodes, and determining that the synchronization with the block data is completed through finding a same largest block number fed back from most nodes consistent with a largest local block number.

In some embodiments, any of the current consensus nodes 1003 may be configured for initiating the view change in response to detecting any of the following conditions: a number of consensus nodes in the local consensus node list is inconsistent with a number of consensus nodes in a current view, and consensus node identifiers in the local consensus node list are inconsistent with consensus node identifiers in the current view.

In some embodiments, any of the current consensus nodes 1003 may be configured for initiating the view change in response to receiving a message broadcast by the node to be added for initiating view change.

In some embodiments, after the node to be added 1002 synchronizes with the block data in the blockchain, the node to be added 1002 is configured for sending a transaction request for node activation to the blockchain network, and the current consensus nodes 1003 are configured for executing the transaction request for node activation after performing consensus verification.

In some embodiments, any of the current consensus nodes 1003 may be configured for initiating the view change in response to detecting any of the following conditions: a number of activated consensus nodes in the local consensus node list is inconsistent with a number of activated consensus nodes in a current view, and identifiers of activated consensus nodes in the local consensus node list are inconsistent with identifiers of the activated consensus nodes in the current view.

In some embodiments, a number of replicas in the view change is a total number of consensus nodes including the node to be added.

Figure 11A:
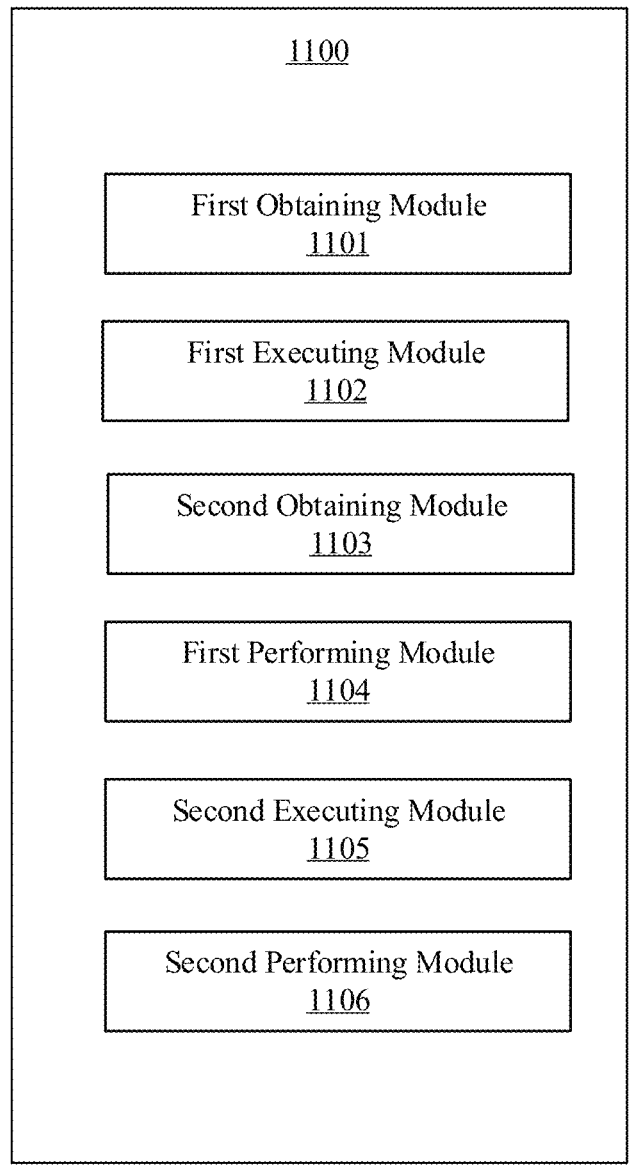
FIG. 11A illustrates a block diagram of an apparatus for adding a node in a blockchain network in accordance with some embodiments.

FIG. 11A illustrates a block diagram of an apparatus 1100 for adding a node in a blockchain network in accordance with some embodiments. The apparatus 1100 may be an example of an implementation of one or more components of a node (e.g., the blockchain node of FIGS. 1-3, the current consensus node of FIG. 7 or FIG. 10). The node may be a primary or backup node of a PBFT-based blockchain network. One or more steps of the method 800 and method 900 may be implemented by the apparatus 1100.

The apparatus 1100 may be implemented in a computer system or device comprising one or more processors and one or more non-transitory computer-readable storage media (e.g., one or more memories) coupled to the one or more processors and configured with instructions executable by the one or more processors to cause the system or device (e.g., the processor) to perform steps of the above-described method (e.g., the method 800 or 900). The apparatus 1100 may comprise various units/modules corresponding to the instructions (e.g., software instructions).

In some embodiments, the apparatus 1100 may comprise a first obtaining module 1101 for obtaining a first transaction comprising a first request for adding a node as a new consensus node of the blockchain network; a first executing module 1102 for, in response to that consensus verification of the first transaction succeeds, executing the first transaction and numbering the node in a node list based on numbers of a plurality of current consensus nodes of the blockchain network; a second obtaining module 1103 for obtaining from the node a second transaction comprising a second request for activating the node; a first performing module 1104 for performing consensus verification of the second transaction; a second executing module 1105 for, in response to that the consensus verification of the second transaction succeeds, executing the second transaction for activating the node; and a second performing module 1106 for performing view change for the node to participate in future consensus verification as the new consensus node of the blockchain network. One or more of the modules (e.g., the second obtaining module 1103, the first performing module 1104, the second executing module 1105) are optional.

Figure 11B:
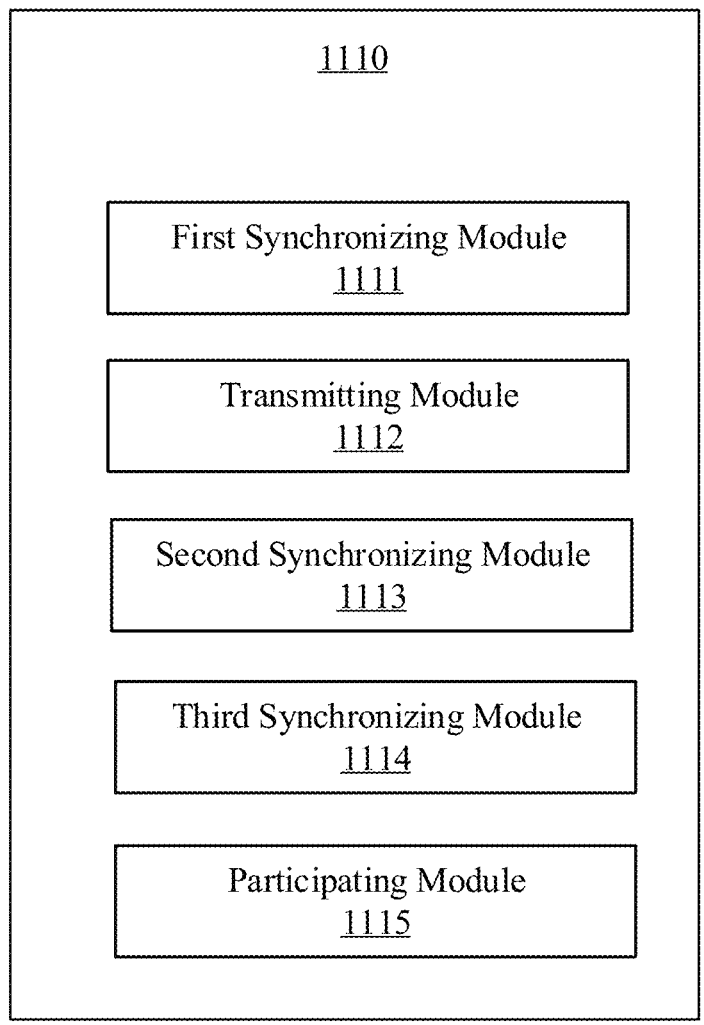
FIG. 11B illustrates a block diagram of an apparatus for adding a node in a blockchain network in accordance with some embodiments.

FIG. 11B illustrates a block diagram of an apparatus 1110 for adding a node in a blockchain network in accordance with some embodiments. The apparatus 1110 may be an example of an implementation of one or more components of a node to be added in a blockchain network (e.g., the node to be added of FIG. 7 or FIG. 10). The node may be added to become a primary or backup node of a PBFT-based blockchain network. One or more steps of the method 800 and method 910 may be implemented by the apparatus 1110.

The apparatus 1110 may be implemented in a computer system or device comprising one or more processors and one or more non-transitory computer-readable storage media (e.g., one or more memories) coupled to the one or more processors and configured with instructions executable by the one or more processors to cause the system or device (e.g., the processor) to perform steps of the above-described method (e.g., the method 800 or 910). The apparatus 1110 may comprise various units/modules corresponding to the instructions (e.g., software instructions).

In some embodiments, the apparatus 1110 may comprise a first synchronizing module 1111 for synchronizing with a blockchain to obtain a first local blockchain copy, wherein the blockchain network maintains the blockchain and comprises a plurality of current consensus nodes; a transmitting module 1112 for, in response to determining that the first local blockchain copy comprises a first request to add the node as a new consensus node of the blockchain network, transmitting to one or more of the plurality of current consensus nodes a second transaction comprising a second request to activate the node; a second synchronizing module 1113 for, after the second transaction is added to the blockchain, synchronizing the first local blockchain copy with the blockchain to obtain a second local blockchain copy; a third synchronizing module 1114 for, after the plurality of current consensus nodes perform a view change with respect to the blockchain, synchronizing the second local blockchain copy with the blockchain to obtain a third local blockchain copy; and a participating module 1115 for participating in consensus verification as the new consensus node of the blockchain network. One or more of the modules (e.g., the third synchronizing module 1114, the participating module 1115) are optional.

The techniques described herein may be implemented by one or more special-purpose computing devices. The special-purpose computing devices may be desktop computer systems, server computer systems, portable computer systems, handheld devices, networking devices or any other device or combination of devices that incorporate hard-wired and/or program logic to implement the techniques. The special-purpose computing devices may be implemented as personal computers, laptops, cellular phones, camera phones, smart phones, personal digital assistants, media players, navigation devices, email devices, game consoles, tablet computers, wearable devices, or a combination thereof. Computing device(s) may be generally controlled and coordinated by operating system software. Conventional operating systems control and schedule computer processes for execution, perform memory management, provide file system, networking, I/O services, and provide a user interface functionality, such as a graphical user interface ("GUI"), among other things. The various systems, apparatuses, storage media, modules, and units described herein may be implemented in the special-purpose computing devices, or one or more computing chips of the one or more special-purpose computing devices. In some embodiments, the instructions described herein may be implemented in a virtual machine on the special-purpose computing device. When executed, the instructions may cause the special-purpose computing device to perform various methods described herein. The virtual machine may include a software, hardware, or a combination thereof.

Figure 12:
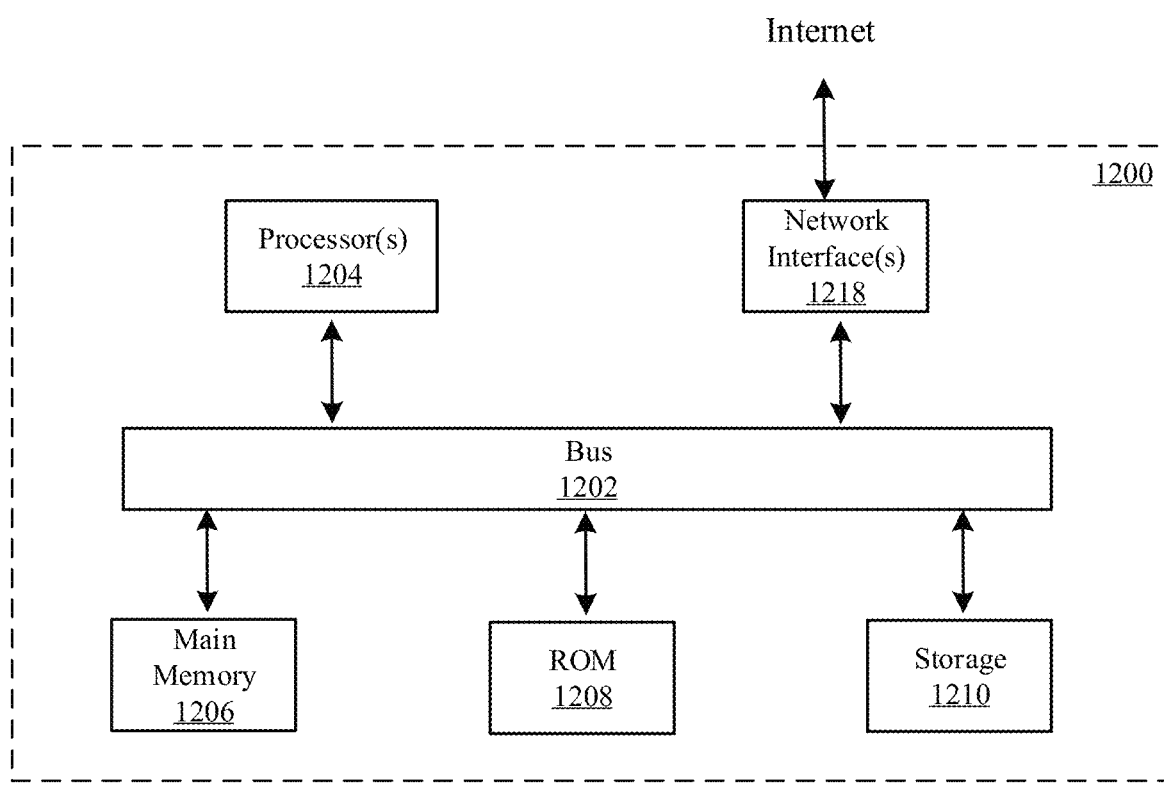
FIG. 12 illustrates a block diagram of an exemplary computer system in which any of the embodiments described herein may be implemented.

FIG. 12 illustrates a block diagram of a computer system in which any of the embodiments described herein may be implemented. The system 1200 may be implemented in any of the components of the environments, systems, or devices illustrated in FIGS. 1-7, FIG. 10, FIG. 11A, and FIG. 11B. One or more of the methods illustrated by FIGS. 8, 9A, and 9B may be performed by one or more implementations of the computer system 1200.

The computer system 1200 may include a bus 1202 or other communication mechanism for communicating information, one or more hardware processor(s) 1204 coupled with bus 1202 for processing information. Hardware processor(s) 1204 may be, for example, one or more general purpose microprocessors.

The computer system 1200 may also include a main memory 1206, such as a random access memory (RAM), cache and/or other dynamic storage devices, coupled to bus 1202 for storing information and instructions executable by processor(s) 1204. Main memory 1206 also may be used for storing temporary variables or other intermediate information during execution of instructions executable by processor(s) 1204. Such instructions, when stored in storage media accessible to processor(s) 1204, render computer system 1200 into a special-purpose machine that is customized to perform the operations specified in the instructions. The computer system 1200 may further include a read only memory (ROM) 1208 or other static storage device coupled to bus 1202 for storing static information and instructions for processor(s) 1204. A storage device 1210, such as a magnetic disk, optical disk, or USB thumb drive (Flash drive), etc., may be provided and coupled to bus 1202 for storing information and instructions.

The computer system 1200 may implement the techniques described herein using customized hard-wired logic, one or more ASICs or FPGAs, firmware and/or program logic which in combination with the computer system causes or programs computer system 1200 to be a special-purpose machine. According to one embodiment, the operations, methods, and processes described herein are performed by computer system 1200 in response to processor(s) 1204 executing one or more sequences of one or more instructions contained in main memory 1206. Such instructions may be read into main memory 1206 from another storage medium, such as storage device 1210. Execution of the sequences of instructions contained in main memory 1206 may cause processor(s) 1204 to perform the process steps described herein. In alternative embodiments, hard-wired circuitry may be used in place of or in combination with software instructions.

The main memory 1206, the ROM 1208, and/or the storage device 1210 may include non-transitory storage media. The term "non-transitory media," and similar terms, as used herein refers to media that store data and/or instructions that cause a machine to operate in a specific fashion, the media excludes transitory signals. Such non-transitory media may comprise non-volatile media and/or volatile media. Non-volatile media includes, for example, optical or magnetic disks, such as storage device 1210. Volatile media includes dynamic memory, such as main memory 1206. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The computer system 1200 may include a network interface 1218 coupled to bus 1202. Network interface 1218 may provide a two-way data communication coupling to one or more network links that are connected to one or more local networks. For example, network interface 1218 may be an integrated services digital network (ISDN) card, cable modem, satellite modem, or a modem to provide a data communication connection to a corresponding type of telephone line. As another example, network interface 1218 may be a local area network (LAN) card to provide a data communication connection to a compatible LAN (or WAN component to communicate with a WAN). Wireless links may also be implemented. In any such implementation, network interface 1218 may send and receive electrical, electromagnetic or optical signals that carry digital data streams representing various types of information.

The computer system 1200 can send messages and receive data, including program code, through the network(s), network link and network interface 1218. In the Internet example, a server might transmit a requested code for an application program through the Internet, the ISP, the local network and the network interface 1218.

The received code may be executed by processor(s) 1204 as it is received, and/or stored in storage device 1210, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another or may be combined in various ways. All possible combinations and sub-combinations are intended to fall within the scope of this specification. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The examples of blocks or states may be performed in serial, in parallel, or in some other manner. Blocks or states may be added to or removed from the disclosed embodiments. The examples of systems and components described herein may be configured differently than described. For example, elements may be added to, removed from, or rearranged compared to the disclosed embodiments.

The various operations of methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some embodiments, the processors or processor-implemented engines may be located in a single geographic location (e.g., within a home environment, an office environment, or a server farm). In other embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific embodiments, various modifications and changes may be made to these embodiments without departing from the broader scope of embodiments of the specification. The Detailed Description should not to be taken in a limiting sense, and the scope of various embodiments is defined only by the appended claims, along with the full range of equivalents to which such claims are entitled. Furthermore, related terms (such as "first," "second," "third," etc.) used herein do not denote any order, height, or importance, but rather are used to distinguish one element from another element. Furthermore, the terms "a," "an," and "plurality" do not denote a limitation of quantity herein, but rather denote the presence of at least one of the articles mentioned. In addition, herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The invention claimed is:

1. A computer-implemented method for adding a node in a blockchain network, performed by the node to be added in the blockchain network, comprising:

transmitting a first transaction comprising a first request for adding the node as a new consensus node of the blockchain network to one or more of a plurality of current consensus nodes for the plurality of current consensus nodes to perform consensus verification of the first transaction and to add the first transaction to a blockchain in response to that the consensus verification of the first transaction succeeds, wherein the blockchain network maintains the blockchain and comprises the plurality of current consensus nodes;

synchronizing with the blockchain to obtain a first local blockchain copy;

in response to determining that the first local blockchain copy comprises the first request to add the node as the new consensus node of the blockchain network, transmitting to one or more of the plurality of current consensus nodes a second transaction comprising a second request to activate the node; and after the second transaction is added to the blockchain, synchronizing the first local blockchain copy with the blockchain to obtain a second local blockchain copy.

2. The method of claim 1, wherein the synchronizing with a blockchain comprises:
sending one or more synchronization requests respectively to one or more of the plurality of current consensus nodes to obtain data in the blockchain.

3. The method of claim 1, wherein the transmitting to one or more of the plurality of current consensus nodes a second transaction comprising a second request to activate the node comprises:
transmitting to one or more of the plurality of current consensus nodes the second transaction comprising the second request to activate the node, for the plurality of current consensus nodes to perform consensus verification of the second transaction and execute the second transaction for activating the node in response to that the consensus verification of the second transaction succeeds.

4. The method of claim 3, further comprising:
after the plurality of current consensus nodes perform a view change with respect to the blockchain, synchronizing the second local blockchain copy with the blockchain to obtain a third local blockchain copy.

5. The method of claim 4, further comprising:
participating in consensus verification as the new consensus node of the blockchain network.

6. The method of claim 4, further comprising determining through checkpoint messages that the synchronization of the first or second local blockchain copy is completed.

7. The method of claim 4, further comprising sending a request for querying a current largest block number to at least some of the plurality of current consensus nodes, and determining that the synchronization of the first or second local blockchain copy is completed through finding a same largest block number returned from the at least some of the plurality of current consensus nodes to be consistent with a largest local block number.

8. The method of claim 1, wherein:
a process of adding the node as the new consensus node of the blockchain network causes no disruption to the blockchain network's operation.

9. The method of claim 1, wherein the first request to add the node as the new consensus node of the blockchain network comprises:
a request to change the node from an inactivated consensus node of the blockchain network to an activated consensus node of the blockchain network.

10. The method of claim 1, wherein the first request to add the node as the new consensus node of the blockchain network comprises:
a request to include the node in the blockchain network as the new consensus node.

11. A non-transitory computer-readable storage medium for adding a node in a blockchain network, the storage medium implemented in the node to be added in the blockchain network, the storage medium configured with instructions executable by one or more processors to cause the one or more processors to perform operations comprising:
transmitting a first transaction comprising a first request for adding the node as a new consensus node of the blockchain network to one or more of a plurality of current consensus nodes for the plurality of current consensus nodes to perform consensus verification of the first transaction and to add the first transaction to a blockchain in response to that the consensus verification of the first transaction succeeds, wherein the blockchain network maintains the blockchain and comprises the plurality of current consensus nodes;
synchronizing with the blockchain to obtain a first local blockchain copy;
in response to determining that the first local blockchain copy comprises the first request to add the node as the new consensus node of the blockchain network, transmitting to one or more of the plurality of current consensus nodes a second transaction comprising a second request to activate the node; and
after the second transaction is added to the blockchain, synchronizing the first local blockchain copy with the blockchain to obtain a second local blockchain copy.

12. The storage medium of claim 11, wherein the synchronizing with a blockchain comprises:
sending one or more synchronization requests respectively to one or more of the plurality of current consensus nodes to obtain data in the blockchain.

13. The storage medium of claim 11, wherein the transmitting to one or more of the plurality of current consensus nodes a second transaction comprising a second request to activate the node comprises:
transmitting to one or more of the plurality of current consensus nodes the second transaction comprising the second request to activate the node, for the plurality of current consensus nodes to perform consensus verification of the second transaction and execute the second transaction for activating the node in response to that the consensus verification of the second transaction succeeds.

14. The storage medium of claim 13, wherein the operations further comprise:
after the plurality of current consensus nodes perform a view change with respect to the blockchain, synchronizing the second local blockchain copy with the blockchain to obtain a third local blockchain copy.

15. The storage medium of claim 14, wherein the operations further comprise:
participating in consensus verification as the new consensus node of the blockchain network.

16. A system for adding a node in a blockchain network, the system implemented in the node to be added in the blockchain network, the system comprising one or more processors and one or more computer-readable memories coupled to the one or more processors and having instructions stored thereon that are executable by the one or more processors to perform operations comprising:
transmitting a first transaction comprising a first request for adding the node as a new consensus node of the blockchain network to one or more of a plurality of current consensus nodes for the plurality of current consensus nodes to perform consensus verification of the first transaction and to add the first transaction to a blockchain in response to that the consensus verification of the first transaction succeeds, wherein the blockchain network maintains the blockchain and comprises the plurality of current consensus nodes;
synchronizing with the blockchain to obtain a first local blockchain copy;
in response to determining that the first local blockchain copy comprises the first request to add the node as the new consensus node of the blockchain network, transmitting to one or more of the plurality of current consensus nodes a second transaction comprising a second request to activate the node; and
after the second transaction is added to the blockchain, synchronizing the first local blockchain copy with the blockchain to obtain a second local blockchain copy.

17. The system of claim 16, wherein the synchronizing with a blockchain comprises:
  sending one or more synchronization requests respectively to one or more of the plurality of current consensus nodes to obtain data in the blockchain.

18. The system of claim 16, wherein the transmitting to one or more of the plurality of current consensus nodes a second transaction comprising a second request to activate the node comprises:
  transmitting to one or more of the plurality of current consensus nodes the second transaction comprising the second request to activate the node, for the plurality of current consensus nodes to perform consensus verification of the second transaction and execute the second transaction for activating the node in response to that the consensus verification of the second transaction succeeds.

19. The system of claim 18, wherein the operations further comprise:
  after the plurality of current consensus nodes perform a view change with respect to the blockchain, synchronizing the second local blockchain copy with the blockchain to obtain a third local blockchain copy.

20. The system of claim 19, wherein the operations further comprise:
  participating in consensus verification as the new consensus node of the blockchain network.

\* \* \* \* \*